US011941605B2

(12) United States Patent
Maes et al.

(10) Patent No.: US 11,941,605 B2
(45) Date of Patent: Mar. 26, 2024

(54) ELECTRONIC TRANSACTION

(71) Applicant: WORLDLINE SA, Brussels (BE)

(72) Inventors: Johan Maes, Duisburg (BE); Guillaume Lefebvre, Meurchin (FR); Jean-Baptiste Drucker, Hellemmes-Lille (FR); Mark Vanophalvens, Meerbeek (BE)

(73) Assignee: WORLDLINE SA, Brussels (BE)

( * ) Notice: Subject to any disclaimer, the term of this patent is extended or adjusted under 35 U.S.C. 154(b) by 201 days.

(21) Appl. No.: 17/422,698

(22) PCT Filed: Feb. 18, 2020

(86) PCT No.: PCT/EP2020/054225
§ 371 (c)(1),
(2) Date: Jul. 13, 2021

(87) PCT Pub. No.: WO2020/169597
PCT Pub. Date: Aug. 27, 2020

(65) Prior Publication Data
US 2022/0122056 A1 Apr. 21, 2022

(30) Foreign Application Priority Data
Feb. 18, 2019 (EP) .................................. 19157806

(51) Int. Cl.
*G06Q 20/32* (2012.01)
*G06Q 20/40* (2012.01)
(52) U.S. Cl.
CPC ..... *G06Q 20/3278* (2013.01); *G06Q 20/3224* (2013.01); *G06Q 20/401* (2013.01)

(58) Field of Classification Search
CPC .......... G06Q 20/3278; G06Q 20/3224; G06Q 20/401
See application file for complete search history.

(56) References Cited

U.S. PATENT DOCUMENTS 11,017,421 B1 * 5/2021 DeAngelo ............ G06Q 20/405
2010/0223145 A1 * 9/2010 Dragt ..................... G06Q 20/20
705/17

(Continued)

FOREIGN PATENT DOCUMENTS

WO 2020169597 A1 8/2020

OTHER PUBLICATIONS

"What is RFID," dated Aug. 11, 2017 https://go-rfid.com/rfid-stories/technology-news/what-is-rfid (Year: 2017).*

(Continued)

*Primary Examiner* — Gregory S Cunningham, II

(57) ABSTRACT

The invention relates to an electronic transaction method. The method comprises carrying out an initiation communication between a terminal device and a mobile device, and carrying out an electronic transaction on the basis of the initiation communication between the terminal device and the mobile device. The initiation communication between the terminal device and the mobile device is a unidirectional communication in which initiation data is transmitted from the terminal device to the mobile device. The invention furthermore relates to a terminal device for use in an electronic transaction method, and to a transaction application for a mobile device for use in an electronic transaction method.

14 Claims, 13 Drawing Sheets

(56) References Cited

U.S. PATENT DOCUMENTS

| | | | | |
|---|---|---|---|---|
| 2010/0293093 | A1* | 11/2010 | Karpenko | G06Q 20/40 |
| | | | | 709/204 |
| 2010/0320266 | A1* | 12/2010 | White | G06Q 20/3278 |
| | | | | 235/375 |
| 2014/0188646 | A1* | 7/2014 | Itwaru | G06Q 20/3272 |
| | | | | 705/21 |
| 2016/0012421 | A1* | 1/2016 | Chitilian | G06Q 20/4014 |
| | | | | 705/67 |
| 2016/0180325 | A1* | 6/2016 | Davis | G06Q 20/40 |
| | | | | 705/44 |
| 2017/0293909 | A1* | 10/2017 | Song | G06Q 20/322 |
| 2022/0051231 | A1* | 2/2022 | Laracey | G06Q 20/3678 |
| 2022/0405737 | A1* | 12/2022 | McCauley | G06Q 20/3223 |

OTHER PUBLICATIONS

Foreign Communication from a Related Counterpart Application, International Search Report and Written Opinion dated May 13, 2020, International Application No. PCT/EP2020/054225 filed on Feb. 18, 2020.

\* cited by examiner

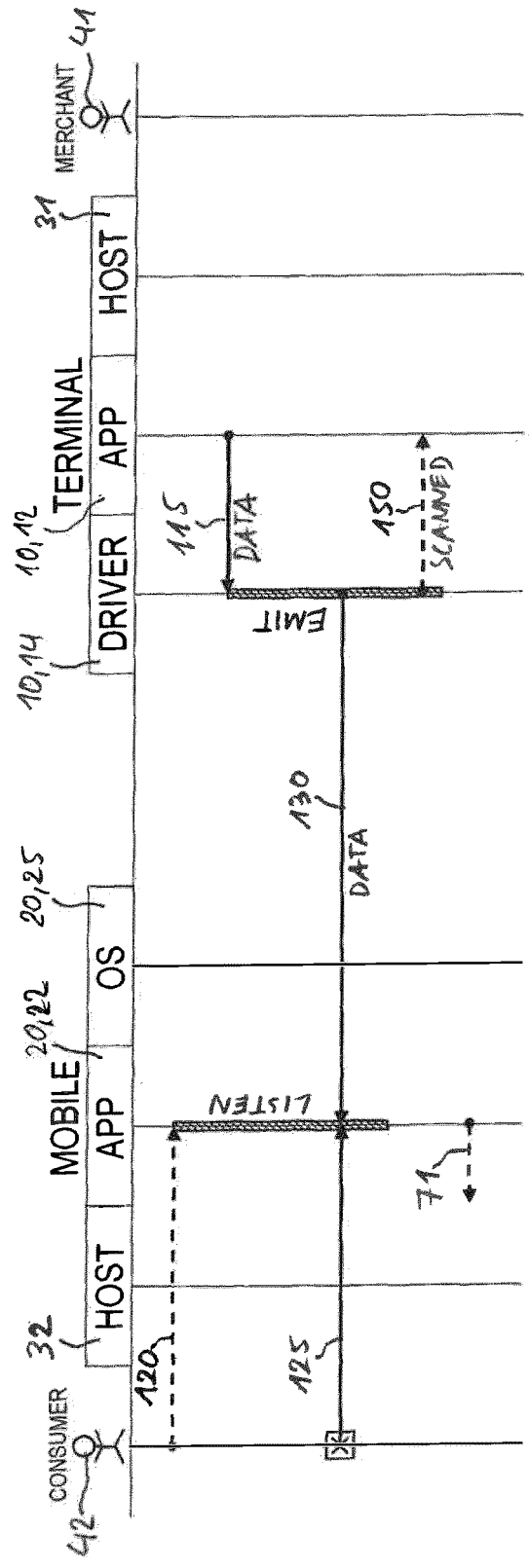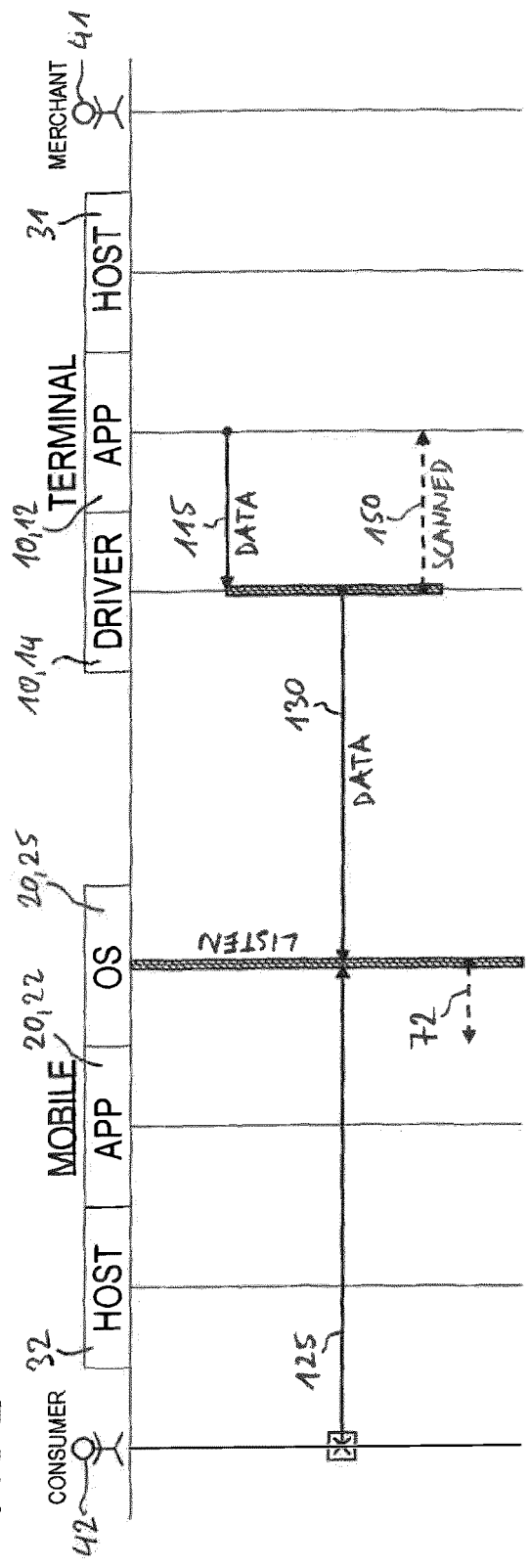

ELECTRONIC TRANSACTION

CROSS-REFERENCE TO RELATED APPLICATIONS

The present application is a filing under 35 U.S.C. 371 as the National Stage of International Application No. PCT/EP2020/054225, filed Feb. 18, 2020, entitled "ELECTRONIC TRANSACTION," which claims priority to European Application No. 19157806.1 filed with the European Patent Office on Feb. 18, 2019, both of which are incorporated herein by reference in their entirety for all purposes.

DESCRIPTION

The present invention relates to an electronic transaction method. The invention furthermore relates to a terminal device for use in an electronic transaction method, and to a transaction application for a mobile device for use in an electronic transaction method. Nowadays, mobile devices such as smartphones are increasingly used for a large number of different applications. This includes electronic transactions such as payment transactions and other transactions like e.g. transferring a ticket or a receipt.

The object of the invention is to provide an improved solution for carrying out an electronic transaction.

This object is achieved by means of the features of the independent patent claims. Further advantageous embodiments of the invention are specified in the dependent claims. According to one aspect of the invention, an electronic transaction method is proposed. The method comprises carrying out an initiation communication between a terminal device and a mobile device, and carrying out an electronic transaction on the basis of the initiation communication between the terminal device and the mobile device. The initiation communication between the terminal device and the mobile device is a unidirectional communication in which initiation data is transmitted from the terminal device to the mobile device.

By means of the proposed method, it is possible to carry out an electronic transaction with the participation of a mobile device from a large variety of different mobile devices. This includes mobile devices which are already available or, respectively, which are already being used by users. Carrying out the method is tied to the condition that the mobile device used is able to receive initiation data from the terminal device. Moreover, the application of the method may be carried out with the participation of an already available terminal device or, respectively, a terminal device which is already being used. In this respect, no additional hardware may be required.

In the context of the proposed method, the adjective "unidirectional" may mean that with regard to the electronic transaction to be carried out, no other communication was carried out in advance between the terminal device and the mobile device. In this respect, another communication or, respectively, other communications may have taken place before between the terminal device and the mobile device, e.g. with regard to other electronic transactions.

Further possible embodiments and details of the method are described more specifically in the following.

The electronic transaction carried out in the method may be e.g. an electronic payment transaction such as an electronic funds transfer transaction (any means to transfer fiat or digitized funds). Other possible examples are a loyalty savings or redemption transaction, or transactions such as electronically transferring a ticket, electronically transferring a receipt, electronically transferring a voucher, electronically transferring cardholder data or electronically subscribing to one or several specific services. It is also possible that carrying out the electronic transaction comprises carrying out a plurality of transactions or, respectively, a plurality of the above-mentioned transactions.

The electronic device which may be used in the method may be e.g. a mobile phone or a smartphone. Other possible examples are a tablet or a wearable electronic device.

Both the terminal device and the mobile device may be connected to or, respectively, may be configured to communicate with a computer host system. The host system may comprise a respective computer host associated with the terminal device and a respective computer host associated with the mobile device. These hosts may be referred to as terminal host and mobile host. In this connection, it is pointed out that the adjective "mobile" only relates to the correlation between the mobile device and the associated mobile host.

The actual electronic transaction which is initiated by means of the initiation communication between the terminal device and the mobile device may be carried out or executed by means of computer host system, in particular the terminal host. The terminal device and the mobile device may be connected to the host system via the internet such that communications between the two devices and the computer host system may be carried out via the internet. This may also apply to communications between the terminal host and mobile host. In this regard, a cloud computing architecture may be present. The terminal device may comprise an application installed on and running on the terminal device which may be referred to as terminal application. The terminal device may furthermore comprise a communication driver which may be controlled by means of the terminal application. The communication driver may be furthermore connected to a communication means of the terminal device. The communication means which may be driven by the communication driver may be configured to provide or, respectively, emit data signals. Transmitting the initiation data from the terminal device may carried out by means of the terminal application which may control the communication means of the terminal device via the communication driver to provide or emit respective data signals. The terminal application may furthermore be connected to or, respectively, be configured to communicate with a terminal host associated with the terminal device. In this way, a communication between the terminal device and the associated terminal host may be carried out by means of the terminal application. Depending on the embodiment, the terminal device may furthermore comprise a wireless communication means or module for establishing a wireless connection.

The mobile device may comprise an operating system running on the mobile device. Moreover, the mobile device may comprise an application which may be used with regard to the electronic transaction, and which may be referred to as transaction application. The transaction application may be connected to or, respectively, may be configured to communicate with a mobile host associated with the mobile device. In this way, a communication between the mobile device and the associated mobile host may be carried out by means of the transaction application. The mobile device may furthermore comprise a communication means which is configured to receive data signals from the terminal device. The communication means may be controlled by means of the operating system or by means of the transaction application. In this regard, receiving the initiation data transmitted from the terminal device may be carried out by means of the operating system or the transaction application, together with the communication means of the mobile device. Apart from this, the mobile device may comprise a data receiving application which may control the communication means of the mobile device such that receiving the initiation data may be carried out by means of the data receiving application, together with the communication means of the mobile device. Depending on the embodiment, the mobile device may furthermore comprise a browser for establishing an internet session and/or a wireless communication means or module for establishing a wireless connection.

Concerning a transaction application of the mobile device, it is possible that such an application is a native application. The transaction application may also be a progressive web application (PWA), which may be used and/or launched in combination with a browser of the mobile device. Moreover, the transaction application may be a standalone application, or a functionality embedded in another application, such as e.g. a banking application or a specific merchant wallet application. With regard to PWA, the transaction application may also be present in the form of an internet or, respectively, web page with e.g. advanced functionalities.

With regard to carrying out the initiation communication between the terminal device and the mobile device, the embodiments described in the following may be considered.

In a possible embodiment, the initiation communication between the terminal device and the mobile device is carried out by means of near field communication (NFC). With respect to this, the terminal device may comprise a communication driver in the form of a NFC driver, and a communication means connected to the communication driver in the form of a NFC module. The NFC module may comprise a RFID antenna (radio-frequency identification) in the form of a coil and, as the case may be, a respective chipset. The mobile device may also comprise a communication means in the form of a NFC module with a RFID antenna. With regard to the initiation communication, the NFC modules and the respective RFID antennas may be powered up, the mobile device may be brought into close proximity to the terminal device (so-called "tapping"), and the transmitting of the initiation data from the terminal device to the mobile device may be carried out by means of electromagnetic induction. The initiation data may be provided in an appropriate format such as NDEF (NFC data exchange format). In this respect, during the initiation communication, the terminal device may act in the form of a NFC tag or, respectively, NDEF NFC tag. The use of near field communication makes it possible to detect, by means of the terminal device, when the mobile device, after the transmission of the initiation data was carried out, is again removed from the terminal device.

In another embodiment, the initiation communication between the terminal device and the mobile device is carried out by means of visible light communication (VLC). With regard to this, the terminal device may comprise a communication means connected to a communication driver which is configured for emitting light or, respectively, light signals. Such a communication means or, respectively, light source, may e.g. comprise a light emitting diode (LED) or a display. The mobile device may comprise a communication means configured to receive light or, respectively, light signals. In this regard, the mobile device may e.g. comprise a photodiode which is used as the communication means, or another component, e.g. a camera of the mobile device (if available). With regard to the initiation communication, the mobile device may be brought into close proximity to the terminal device, and the initiation data may be transmitted by emitting respective light signals from the light emitting communication means of the terminal device which may be received by the light receiving communication means of the mobile device. With respect to VLC, the light signals may be provided, on the basis of a respective modulation, in such a way that they cannot be noticed by the human eye.

In another embodiment, the initiation communication between the terminal device and the mobile device is carried out by means of acoustic communication. With regard to this, the terminal device may comprise a communication means connected to a communication driver which is configured for emitting audio signals. Such a communication means may e.g. comprise a speaker. The mobile device may comprise a communication means configured to receive audio signals. In this respect, e.g. a microphone of the mobile device may be used. With regard to the initiation communication, the mobile device may be brought into close proximity to the terminal device, and the initiation data may be transmitted by emitting respective audio signals from the audio emitting communication means of the terminal device which may be received by the audio receiving communication means of the mobile device.

In the following, further possible embodiments with regard to the initiation communication and with regard to further details of the electronic transaction method are described. Providing the initiation data may be carried out by means of the terminal device or, respectively, by means of a terminal application running on the same. It is also possible that the initiation data is provided by means of a terminal host associated with the terminal device, or by means of the terminal device (or terminal application) and the terminal host together.

In a further embodiment, the initiation data which is transmitted from the terminal device to the mobile device is provided in such a way that the initiation data is uniquely assigned to the electronic transaction. In this regard, for further or, respectively, other electronic transactions to be carried out, different initiation data may be provided in each case. "Uniquely assigned" in this context may mean that with regard to the electronic transaction carried out in the method, the initiation data may be provided only once. This condition may relate to a time interval. An example is a predefined time interval for which it may be assumed that the electronic transaction was finalized before the expiry of the time interval. Alternatively, the time interval for which the initiation data may be provided only once may be a time interval extending to the end of the electronic transaction. After the expiry of such time intervals, the respective initiation data may be used again. The starting point of such time intervals may be e.g. the providing of the initiation data.

Using a uniquely assigned initiation data in the method may provide for a high security and reliability of the method. It is furthermore possible to securely carry out a plurality of electronic transactions in a parallel way. In this regard, for each of the electronic transactions to be carried out, an initiation communication may be carried out using unique initiation data.

The uniquely assigned initiation data may e.g. comprise or, respectively, relate to unique details such as transaction details and/or details regarding a user of the mobile device participating in the electronic transaction.

Alternatively or additionally, the provided initiation data may comprise a transaction identifier which is uniquely assigned to the electronic transaction. Another possible denotation for such an identifier is session identifier. Similarly to the above description, such a unique transaction identifier comprised in the initiation data may be provided only once. This condition may relate to a time interval. An example is a predefined time interval for which it may be assumed that the electronic transaction was finalized before the expiry of the time interval. Alternatively, the time interval for which the transaction identifier may be provided only once may be a time interval extending to the end of the electronic transaction. After the expiry of such time intervals, the respective transaction identifier may be used again. The starting point of such time intervals may be e.g. the providing of the initiation data or, respectively, of the transaction identifier.

The unique transaction identifier may e.g. be provided on the basis of transaction details, and may therefore include information related to transaction details. Alternatively, the unique transaction identifier may comprise or, respectively, may reflect a uniquely assigned number. For further electronic transactions, transaction identifiers in the form of or reflecting other uniquely assigned numbers may be provided. Such numbers may be e.g. consecutive numbers or random numbers. Again, this may relate to a time interval, as described above.

In a further embodiment, the initiation data comprises a transaction identifier. The transaction identifier is stored on a terminal host associated with the terminal device. Upon transmitting the initiation data from the terminal device to the mobile device, the transaction identifier is transmitted from the mobile device to the terminal host. The electronic transaction is carried out only under the condition that a match between the transmitted transaction identifier and the stored transaction identifier is determined by the terminal host. As indicated above, the transaction identifier may be uniquely assigned to the electronic transaction carried out, thus providing for a high security and reliability of the method.

It is possible that transaction details with regard to the electronic transaction to be carried out are known and may be defined before or, respectively, in the context of carrying out the initiation communication between the terminal device and the mobile device. In such a case, which may also be referred to as "check-out", and in which transaction details may be communicated from the terminal device to the terminal host associated with the terminal device before or in the context of carrying out the initiation communication, it is provided according to a further embodiment that the terminal host, upon receiving the transmitted transaction identifier and determining a match between the transmitted transaction identifier and the stored transaction identifier, initiates carrying out the electronic transaction.

Alternatively, transaction details with regard to the electronic transaction to be carried out may not yet be known or completely known before or, respectively, in the context of carrying out the initiation communication. Instead of this, the transaction details may be completely defined and, as the case may be, communicated to the terminal host at a later point of time. In such a case, which may also be referred to as "check-in", it is provided according to a further embodiment that carrying out the electronic transaction is initiated by means of a user input on the terminal device or by means of a user input on the mobile device. In the former case, information related to the user input on the terminal device may be transmitted from the terminal device to the terminal host associated with the terminal device. In the latter case, information related to the user input on the mobile device may be transmitted from the mobile device to a mobile host associated with the mobile device, and may subsequently be submitted from the mobile host to the terminal host.

In a further embodiment, transmitting the transaction identifier from the mobile device to the terminal host comprises, upon receiving the initiation data by the mobile device, transmitting the transaction identifier from the mobile device to a mobile host associated with the mobile device, and subsequently transmitting the transaction identifier from the mobile host to the terminal host associated with the terminal device. By means of transmitting the transaction identifier from the mobile host to the terminal host, carrying out the electronic transaction may be initiated.

Apart from the transaction identifier, the initiation data may comprise other or further information or, respectively, one or several further data components. This may include data reflecting transaction details, an identifier related to the terminal device, an identifier or, respectively, address identifier related to the terminal host and/or another identifier. Data reflecting transaction details may e.g. be transmitted from the mobile device to a mobile host associated with the mobile device. This may also apply to an identifier related to the terminal host. On the basis of such an identifier, the mobile host may establish a connection with the terminal host in order to transmit the transaction identifier from the mobile host to the terminal host, and thus in order to initiate carrying out the transaction.

Concerning the above-mentioned transmitting of the transaction identifier from the mobile device to an associated mobile host, the embodiments described in the following may be considered.

In a possible embodiment, receiving the initiation data by the mobile device and transmitting the transaction identifier from the mobile device to the associated mobile host is carried out by means of a transaction application of the mobile device. With regard to this, it may be required for a user of the mobile device to open the transaction application before the initiation communication between the terminal device and the mobile device is carried out.

In an alternative embodiment, the initiation data comprises an application identifier. Upon receiving the initiation data by the mobile device, a transaction application which is associated with the application identifier is launched on the mobile device. The transaction identifier is transmitted from the mobile device to the associated mobile host by means of the transaction application launched on the mobile device. Launching the transaction application on the mobile device may be carried out automatically on the basis of the received application identifier. In this way, the electronic transaction method may be carried out in a secure and user-friendly way.

With regard to the above-mentioned embodiment, receiving the initiation data and launching the transaction application on the basis of the application identifier may be carried out by means of an operating system or by means of a data receiving application running on the mobile device. Moreover, the transaction identifier which is comprised in the initiation data may be communicated from the operating system or the data receiving application to the transaction application.

In a further alternative embodiment, the initiation data comprises an internet address identifier. Upon receiving the initiation data by the mobile device, a browser is launched on the mobile device which establishes an internet session with the terminal host on the basis of the internet address identifier. This process may be carried out automatically on the basis of the received internet address identifier. During the internet session, an application identifier is transmitted from the terminal host to the browser. Upon receiving the application identifier by the browser, a transaction application which is associated with the application identifier is launched on the mobile device. This process may be carried out automatically on the basis of the received application identifier. The transaction identifier is transmitted from the mobile device to the associated mobile host by means of the transaction application launched on the mobile device. This embodiment also makes it possible to carry out the electronic transaction method in a secure and user-friendly way.

With respect to the above-mentioned embodiment, receiving the initiation data and launching the browser may be carried out by means of an operating system or by means of a data receiving application running on the mobile device. Receiving the application identifier and launching the transaction application may be carried out by means of the browser.

With respect to using a browser on the mobile device, the following variants may be considered.

In a further embodiment, the application identifier relates to a transaction application which is selected from a plurality of available transaction applications by a user of the mobile device. For carrying out the selection by the user, an internet page indicating the plurality of available transaction applications is displayed on the mobile device by means of the browser during the internet session, and a user input on the mobile device in which one of the available transaction applications is selected by the user is taken into account. This embodiment offers the possibility to carry out the electronic transaction method in a flexible way with a transaction application from a plurality of available transaction applications, wherein the selection of the transaction application used is carried out by means of the user of the mobile device. Information related to the user input on the mobile device may be transmitted to the terminal host by means of the browser during the internet session.

In an alternative embodiment, the application identifier relates to a transaction application which is automatically selected from a plurality of available transaction applications by means of the terminal host. This embodiment allows for carrying out the electronic transaction method in a user-friendly way. For the purpose of the automatic selection, available data such as user preferences, browser cookies, an identifier related to the mobile device or a launching application may be considered by the terminal host.

In a further embodiment, the initiation data comprises an internet address identifier. Upon receiving the initiation data by the mobile device, a browser is launched on the mobile device which establishes an internet session with the terminal host on the basis of the internet address identifier. Launching the browser may be carried out automatically on the basis of the received internet address identifier. During the internet session, the transaction identifier is transmitted from the mobile device to the terminal host by means of the browser launched on the mobile device. This embodiment makes it possible to carry out the electronic transaction method in a simple manner and user-friendly way. Receiving the initiation data and launching the browser may be carried out by means of an operating system or by means of a data receiving application running on the mobile device.

A communication between the mobile device and another participant, e.g. an associated mobile host and e.g. with regard to transmitting a transaction identifier from the mobile device to the mobile host as indicated above, may be carried out at least in part via a mobile internet connection of the mobile device. It is however also possible that the mobile device is "offline", i.e. that the mobile device is not connected via the mobile internet. With regard to this, the following may be considered.

In a further embodiment, the initiation data comprises connection information for establishing a wireless connection different from the initiation communication between the terminal device and the mobile device. Upon transmitting the initiation data from the terminal device to the mobile device, a wireless connection is established between the terminal device and the mobile device on the basis of the connection information. Transmitting the transaction identifier from the mobile device to the terminal host is carried out via the established wireless connection between the terminal device and the mobile device. Apart from the wireless connection, transmitting the transaction identifier from the mobile device to the terminal host may be also based on an internet connection of the terminal device. In this regard, the terminal device may be used as intermediary connection means.

The statement "establishing a wireless connection different from the initiation communication" in this context means that different communication technologies are applied with respect to the initiation communication and with respect to the wireless connection. The wireless connection may be a local wireless connection such as a BLE-connection (Bluetooth low energy) or a Wi-Fi-connection, whereas the previous initiation communication may be, as indicated above, a near field communication, a visible light communication or an acoustic communication. Establishing the wireless connection between the terminal device and the mobile device may be carried out in such a way that, on the basis of the received connection information, an application or, respectively, transaction application of the mobile device initiates an operating system of the mobile device to establish the wireless connection.

The above-mentioned embodiment directed to establishing a wireless connection between the terminal device and the mobile device may be combined with or, respectively, be applied in conjunction with one or several of the embodiments described further above. In this regard, also other information or data may be transmitted from or to the mobile device, or other communications may be established via the wireless connection and, as the case may be, an internet connection of the terminal device. This e.g. applies to transmitting the transaction identifier from the mobile device to an associated mobile host, and to establishing an internet session between a browser of the mobile device and the terminal host.

In order to achieve a high degree of security, an authentication scheme may be included in the electronic transaction method. With regard to this, the following may be considered.

In a further embodiment, a device authentication relating to the mobile device used in the method is carried out by means of a communication between the mobile device and a mobile host associated with the mobile device, taking into account a device identifier which is stored on the mobile host and which relates to the mobile device. In case of a positive mobile device authentication, a first confirmation information is transmitted from the mobile host to the terminal host associated with the terminal device. Moreover, a user authentication relating to a user of the mobile device is carried out by means of requesting the user to enter a pin on the terminal device, transferring information reflecting the entered pin from the terminal device to the mobile host via the terminal host, and taking into account a pin of the user stored on the mobile host. In case of a positive user authentication, a second confirmation information is transmitted from the mobile host to the terminal host.

The above-mentioned embodiment reflects a so-called two-factor authentication scheme. With regard to this, the electronic transaction may be carried out or, respectively, finalized only under the condition that both the mobile device authentication and the user authentication are positive, and that the respective first and second confirmation information is transmitted to and received by the terminal host.

With regard to the device authentication, storing the device identifier on the mobile host may be carried out by means of an application, e.g. the above-mentioned transaction application. In this regard, a device fingerprint and, as the case may be, additional certificates may be considered. Moreover, with regard to the user authentication, information reflecting the entered pin may be transferred from the terminal device to the mobile host via the terminal host in a crypto protected form.

In a further embodiment, a user authentication is carried out in which a user of the mobile device is requested to verify a user identity by means of a user input on the mobile device. By means of this, it is e.g. possible to secure the opening of a transaction application on the mobile device. Another example is securing the finalizing of the electronic transaction. The user input may relate to e.g. a pin number, a fingerprint or a facial recognition. Carrying out such a user authentication may include a communication between the mobile device and an associated mobile host. Moreover, a respective confirmation information may be transmitted from the mobile host to the terminal host.

The electronic transaction may be carried out also on the basis of a local communication between the terminal device and the mobile device. In a further embodiment which may be considered for this purpose, the initiation data comprises a transaction identifier and connection information for establishing a wireless connection different from the initiation communication between the terminal device and the mobile device. This means that different communication technologies are applied. The wireless connection may be a local wireless connection such as a BLE-connection (Bluetooth low energy) or a Wi-Fi-connection, whereas the previous initiation communication may be a near field communication, a visible light communication or an acoustic communication. The transaction identifier is stored on the terminal device, and, upon transmitting the initiation data from the terminal device to the mobile device, a wireless connection is established between the terminal device and the mobile device on the basis of the connection information. The transaction identifier is transmitted from the mobile device to the terminal device via the established wireless connection between the terminal device and the mobile device. The electronic transaction is carried out only under the condition that a match between the transmitted transaction identifier and the stored transaction identifier is determined by the terminal device.

With respect to the above-mentioned embodiment, establishing the wireless connection may be carried out in such a way that, on the basis of the received connection information, an application or, respectively, a transaction application of the mobile device initiates an operating system of the mobile device to establish the wireless connection. Moreover, the electronic transaction may be carried out or, respectively, executed by means of a terminal host associated with the terminal device. This may be based on a communication carried out between the terminal device and the terminal host after the terminal device determined a match between the transmitted transaction identifier and the stored transaction identifier. Moreover, as indicated above, the transaction identifier used may be uniquely assigned to the electronic transaction carried out, thus providing for a high security and reliability of the method.

In a further embodiment, during the initiation communication, the terminal device alternately acts in a transmitting mode for providing the initiation data and in a receiving mode for receiving transactional data. By means of a transaction application of the mobile device, it is suppressed that the mobile device acts in a transmitting mode for providing the transactional data, and, instead of this, it is effected that the mobile device acts in a receiving mode for receiving the initiation data from the terminal device.

The above-mentioned embodiment may be considered for the case that the initiation communication between the terminal device and the mobile device is carried out by means of near field communication. Moreover, the receiving mode of the terminal device may relate to the initiation of an electronic transaction according to a different transaction scheme. The alternating behavior of the terminal device makes it possible that, with respect to the initiation communication, a user of the terminal device does not have to specify and set a respective mode of the terminal device. Instead of this, carrying out the electronic transaction on the basis of the unidirectional initiation communication between the terminal device and the mobile device is arranged by means of the transaction application of the mobile device which causes the mobile device to act in a receiving mode for receiving the initiation data from the terminal device. For this purpose, the transaction application may suppress that an operating system or application of the mobile device is activated in such a way that the mobile device acts in the transmitting mode for providing the transactional data.

With regard to the foregoing, the following may be considered, as well. In a further embodiment, during the initiation communication, the terminal device alternately acts in a transmitting mode for providing the initiation data and in a receiving mode for receiving transactional data. By means of a terminal application of the terminal device, it is detected that the mobile device (or an application of the mobile device) acts in a receiving mode for receiving the initiation data and, upon the detection, it is suppressed that the terminal device acts in a receiving mode for receiving the transactional data and, instead of this, it is effected that the terminal device only acts in the transmitting mode for providing the initiation data. By means of the suppressing, the alternating behavior of the terminal device may be stopped.

According to a further aspect of the invention, a terminal device for use in an electronic transaction method is proposed. The terminal device is configured to carry out an initiation communication with a mobile device in which communication the terminal device provides or, respectively, emits initiation data to be transmitted to the mobile device. Due to the transmitting, the initiation communication between the terminal device and the mobile device may be unidirectional.

The terminal device may be applied in the above-mentioned electronic transaction method or, respectively, may be applied in one or several of the above-mentioned embodiments of the method. In this regard, embodiments, features and details described above may correspondingly be applied with respect to the terminal device.

Concerning the terminal device, the following possible embodiments may be considered.

In one embodiment, the terminal device is configured to provide the initiation data in such a way that the initiation data is uniquely assigned to the electronic transaction to be carried out.

In a further embodiment, the terminal device is configured to provide the initiation data in such a way that the initiation data comprises a transaction identifier. The transaction identifier may be uniquely assigned to the electronic transaction to be carried out.

In a further embodiment, the terminal device is configured to carry out the initiation communication by means of one of the following: near field communication; visible light communication; or acoustic communication.

In a further embodiment, the terminal device is configured in such a way that the electronic transaction may be initiated by means of a user input on the terminal device.

In a further embodiment, the terminal device is configured to provide the initiation data in such a way that the initiation data comprises an application identifier. By means of the application identifier, a transaction application may be automatically launched on the mobile device. By means of the transaction application, the mobile device may communicate with a mobile host associated with the mobile device.

In a further embodiment, the terminal device is configured to provide the initiation data in such a way that the initiation data comprises an internet address identifier. By means of the internet address identifier, a browser may be automatically launched on the mobile device. In this way, an internet session may established between the browser on the mobile device and a terminal host associated with the terminal device on the basis of the internet address identifier.

In a further embodiment, the terminal device is configured to provide the initiation data in such a way that the initiation data comprises connection information for establishing a wireless connection different from the initiation communication between the terminal device and the mobile device. The wireless connection may be a local wireless connection such as a BLE-connection or a Wi-Fi-connection.

In a further embodiment, the terminal device is configured to alternately act in a transmitting mode for providing the initiation data and in a receiving mode for receiving transactional data during the initiation communication.

In a further embodiment, the terminal device is configured to detect that the mobile device (or an application of the mobile device) acts in a receiving mode for receiving the initiation data and, upon the detection, to suppress that the terminal device acts in a receiving mode for receiving the transactional data and, instead of this, to effect that the terminal device only acts in the transmitting mode for providing the initiation data. By means of the suppressing, the alternating behavior of the terminal device may be stopped.

According to a further aspect of the invention, a transaction application for a mobile device for use in an electronic transaction method is proposed. In the method, an initiation communication is carried out between a terminal device and the mobile device.

The transaction application may be applied in the above-mentioned electronic transaction method or, respectively, may be applied in one or several of the above-mentioned embodiments of the method. In this regard, embodiments, features and details described above may correspondingly be applied with respect to the transaction application.

Concerning the transaction application, the following possible embodiments may be considered.

In an embodiment, with regard to the initiation communication, the transaction application is configured to suppress that the mobile device acts in a transmitting mode for providing transactional data, and, instead of this, to effect that the mobile device acts in a receiving mode for receiving initiation data from the terminal device.

During the initiation communication, initiation data may be transmitted from the terminal device to the mobile device, the initiation data comprising a transaction identifier. With regard to this, in a further embodiment, the transaction application is configured to transmit the transaction identifier from the mobile device to a further component. The further component may be e.g. a mobile host associated with the mobile device.

The initiation data may comprise connection information for establishing a wireless connection different from the initiation communication between the terminal device and the mobile device. With regard to this, in a further embodiment, the transaction application is configured to initiate an operating system of the mobile device to establish the wireless connection between the terminal device and the mobile device on the basis of the connection information.

In a further embodiment, the transaction application is realized in the form of an application library or software development kit (SDK) which may be integrated in another application or, respectively, other applications.

The advantageous embodiments and variations of the invention as explained above and/or presented in the dependent claims may be employed individually or else in arbitrary combination with one another, apart from, for example, in cases of unambiguous dependencies or incompatible alternatives.

The above-described properties, features and advantages of this invention and the way in which they are achieved will become clearer and more clearly understood in association with the following description of exemplary embodiments which are explained in greater detail in association with the schematic drawings.

FIGS. 2 and 3 show schematic diagrams illustrating interactions and data flow when carrying out an initiation communication between a terminal device and a mobile device.

On the basis of the following schematic figures, possible variants of an electronic transaction method are described. The electronic transaction carried out in the method may be e.g. an electronic payment transaction such as an electronic funds transfer transaction. Other possible examples are a loyalty savings or redemption transaction, transferring a ticket, transferring a receipt, transferring a voucher, transferring cardholder data or subscribing to one or several specific services. It is also possible that the electronic transaction comprises carrying out a plurality of the above-mentioned actions. As an example, the electronic transaction may comprise a base transaction like e.g. a payment transaction which may be accompanied by one or several VAS (value added service) transactions like e.g. transferring a ticket.

Figure 1:
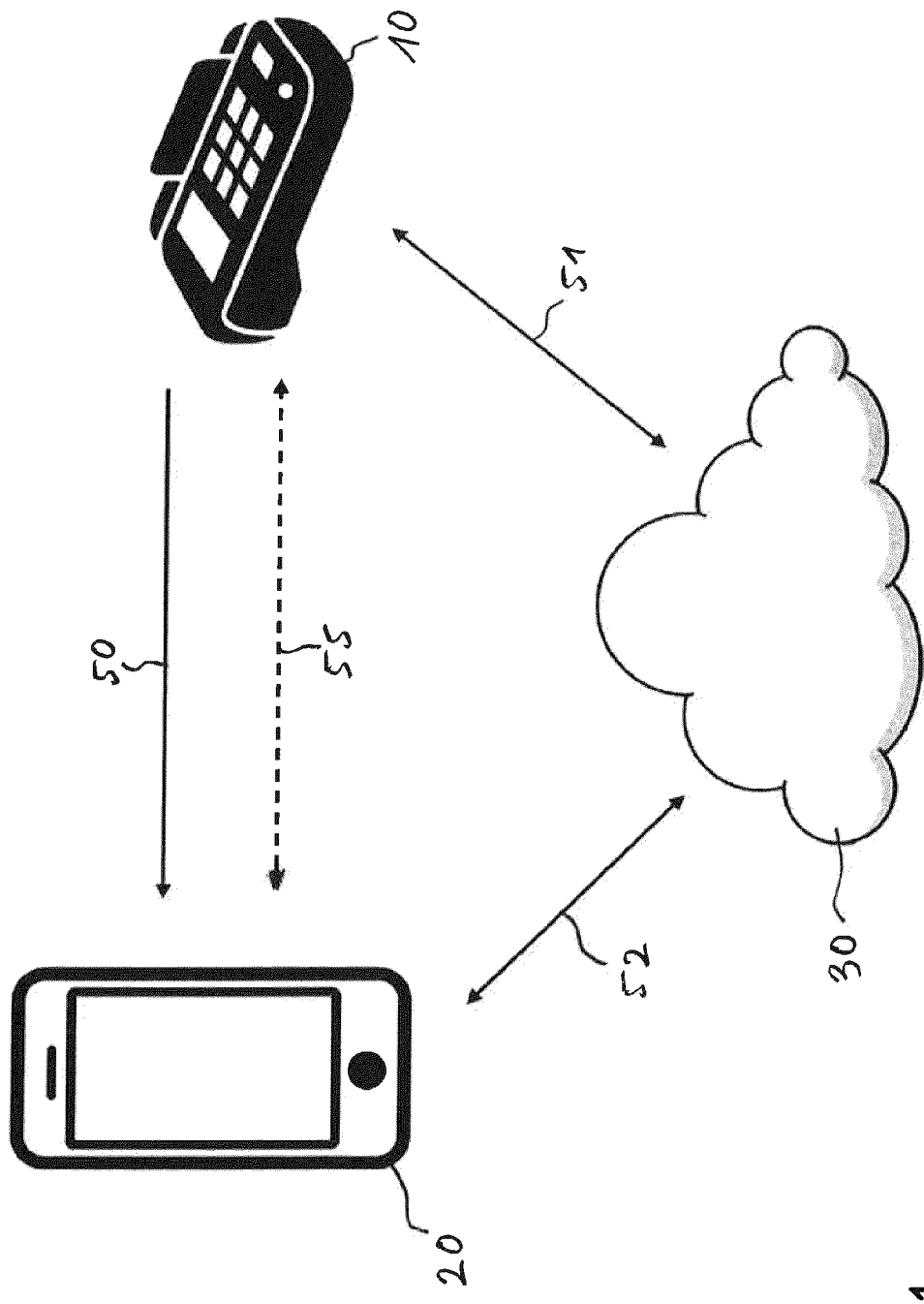
FIG. 1 shows a schematic illustration of a terminal device, a mobile device and a computer host system.

As shown in the schematic illustration of FIG. 1, the electronic transaction method may be carried out with the participation of a terminal device 10, a mobile device 20 and a computer host system 30. The terminal device 10 may be e.g. a payment terminal, also referred to as POS terminal (point of sale), which may be used by a first user 41. With regard to a payment transaction, the user 41 may be e.g. a merchant, as indicated in the figures following FIG. 1. The mobile device 20 may be e.g. a mobile phone or smartphone which may be used by a second user 42. The user 42 may be e.g. a consumer, as indicated in the figures following FIG. 1. Apart from the illustration in FIG. 1, the mobile device 20 may alternatively be e.g. a tablet or a wearable electronic device.

The computer host system 30 may comprise a host 31 associated with the terminal device 10 and a host 32 associated with the mobile device 20, as indicated in the figures following FIG. 1. In order to allow for a better differentiation, the hosts 31, 32 are referred to as terminal host 31 and mobile host 32 in the following. It is pointed out that the adjective "mobile" used with regard to the host 32 only refers to the correlation with the mobile device 20. Apart from these denotations, the terminal host 31 may be also referred to as acceptance host, and the mobile host 32 may be also referred to as wallet host or consumer mobile host.

In the course of the electronic transaction method, an initiation communication 50 is carried out between the terminal device 10 and the mobile device 20, as shown in FIG. 1.

The initiation communication 50 is a unidirectional communication in which initiation data is transmitted from the terminal device 10 to the mobile device 20. The actual electronic transaction which is initiated by means of the initiation communication 50 may be subsequently carried out or, respectively, executed by means of the computer host system 30, in particular by means of the terminal host 31. With regard to this, further communications 51, 52 may be carried out between the devices 10, 20 and the host system 30. For this purpose, the devices 10, 20 may be connected to the host system 30 via the internet such that the communications 51, 52 may be carried out via the internet.

This may also apply to a possible communication taking place between the hosts 31, 32 of the host system 30. In this respect, a cloud computing architecture may be present, as indicated in FIG. 1. As further shown in FIG. 1, another (local) communication 55 may take place between the two devices 10, 20 subsequent to the initiation communication 50.

Details with regard to such communications and with regard to possible embodiments of the electronic transaction method will be discussed below by means of the schematic diagrams shown in the figures following FIG. 1. In this respect, it is pointed out that the diagrams show interactions and data flow, wherein a time course extends from the top to the bottom of the diagrams.

FIGS. 2 and 3 show schematic diagrams illustrating interactions and data flow when carrying out the initiation communication 50 between the terminal device 10 and the mobile device 20 in accordance with two different embodiments. The terminal device 10 may comprise a software application 12 installed on and running on the terminal device 10 which is referred to as terminal application 12 in the following. Another possible component of the terminal device 10 is a communication driver 14 which may be controlled by means of the terminal application 12. The communication driver 14 may be connected to a communication means (not depicted) of the terminal device 10 which may be configured to provide or, respectively, emit data signals in order to provide or emit the initiation data. In this way, transmitting the initiation data during the initiation communication 50 may be carried out by means of the terminal application 12 which may control the communication driver 14 and thus the communication means via the communication driver 14 in order to provide or emit respective data signals. The terminal application 12 may be further connected to or, respectively, may be configured to communicate with the terminal host 31 via, as indicated above, the internet.

As also shown in FIGS. 2 and 3, the mobile device 20 may comprise an operating system 25 and a software application 22 installed on the mobile device 20. The application 22 which may be used with regard to the electronic transaction is referred to as transaction application 22 in the following. The transaction application 22 may be connected to or, respectively, may be configured to communicate with the mobile host 32 via, as indicated above, the internet. The mobile device 20 may furthermore comprise a communication means (not depicted) by means of which data signals transmitted from the terminal device 10 may be received. Depending on the embodiment, the communication means may be controlled by means of the transaction application 22, or by means of the native operating system 25 running in the background. In this way, receiving the initiation data transmitted from the terminal device 10 may be carried out by means of the transaction application 22 or by means of the operating system 25, together with the communication means of the mobile device 20. The first variant is shown in FIG. 2, whereas the second variant is shown in FIG. 3

Concerning the transaction application 22, it is pointed out that such an application may be a native application installed on the mobile device 10. The transaction application 22 may also be a progressive web application (PWA), which may be used and/or launched in combination with a browser of the mobile device 20. Moreover, the transaction application 22 may be a standalone application, or a functionality embedded in another application, such as e.g. a banking application or a specific merchant wallet application.

With regard to PWA, the transaction application may be also present in the form of an internet or, respectively, web page with e.g. advanced functionalities.

With regard to the diagram shown in FIG. 2, in a step 115, the terminal application 12 controls or, respectively, activates the communication driver 14 and transmits the initiation data (DATA) to the driver 14. In response to that, the driver 14 drives the communication means of the terminal device 10 such that respective data signals are provided or, respectively, emitted, and such that the initiation data may be transmitted from the terminal device 10 to the mobile device 20 in a step 130. The providing or emitting of the data signals may be carried out for a time interval, as indicated in FIG. 2 by means of a vertically extending hatched stripe (EMIT). In a step 125, the user 42 of the mobile device 20 brings the mobile device 20 in close proximity to the terminal device 10, which is referred to as tapping or, respectively, scanning in the following. As a consequence, the initiation data transmitted from the terminal device 10 may be received by means of the transaction application 22 of the mobile device 20, in combination with the communication means of the same. Subsequently, the transaction application 22 may carry out a further process or communication (step 71), which may relate to the received initiation data.

FIG. 2 indicates another optional step 120 carried out by the user 42 previous to the step 125, in which the user 42 opens the transaction application 22 on the mobile device 20. In this way, the mobile device 20 may be activated to act in a listening mode for receiving the initiation data transmitted from the terminal device 10, as indicated in FIG. 2 by means of a vertically extending hatched stripe (LISTEN). This mode may also be referred to as reading or scanning mode. The step 120 may also include a user input in which the user 42 activates the scanning mode upon opening the transaction application 22.

The diagram depicted in FIG. 3 shows the alternative procedure in which receiving the initiation data is controlled by means of the operating system 25 of the mobile device 20. By means of the operating system 25, the mobile device 20 may continuously act in the listening or scanning mode, as indicated in FIG. 3 by means of a vertically extending hatched stripe (LISTEN). Similar to FIG. 2, the terminal application 12 drives the communication driver 14 and transmits the initiation data to the driver 14 (step 115, DATA) such that the initiation data is transmitted from the terminal device 10 (step 130). The user 42 carries out a step 125 such that the transmitted initiation data may be received, in this case by means of the operating system 25 of the mobile device 20, in combination with the communication means of the same. Subsequently, the operating system 25 may carry out a further process or communication (step 72), which may relate to the received initiation data.

In a possible embodiment, the initiation communication 50 between the terminal device 10 and the mobile device 20 is carried out by means of near field communication (NFC). In this embodiment, the driver 14 of the terminal device 10 may be a NFC driver, and the communication means of the terminal device 10 may be a NFC module comprising an RFID antenna (radio-frequency identification) in the form of a coil (not depicted). In a similar way, the communication means of the mobile device 20 may be a NFC module comprising an RFID antenna in the form of a coil (not depicted). With respect to carrying out the initiation communication 50 by means of NFC, the following details may be applied.

Figure 4:
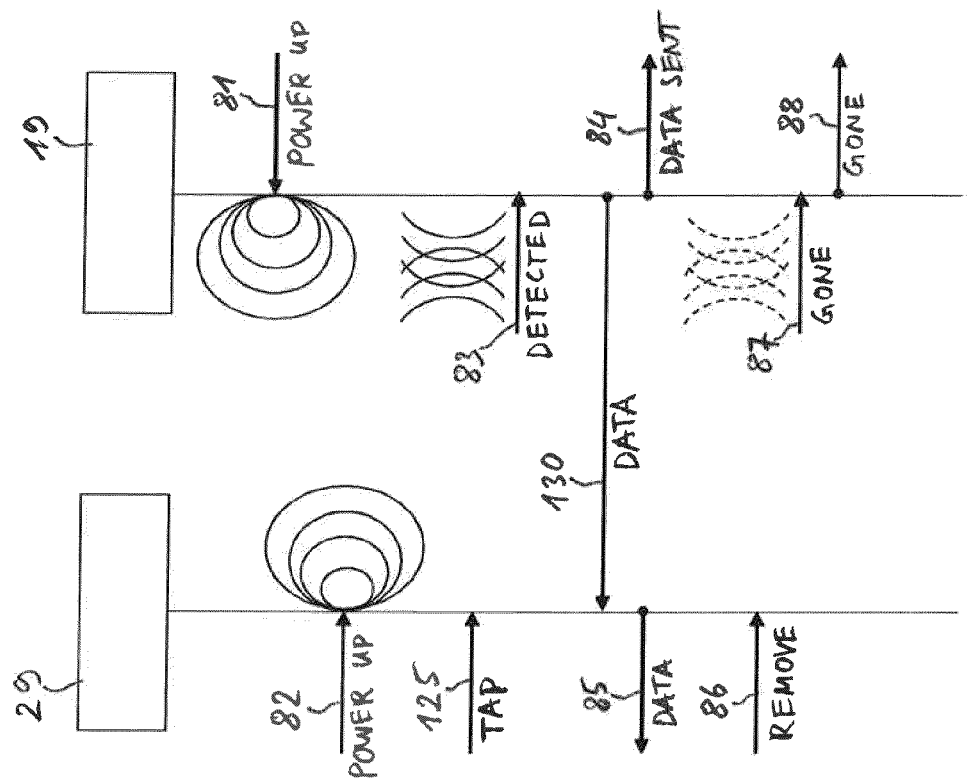
FIG. 4 shows a schematic diagram illustrating interactions and data flow when carrying out a NFC initiation communication between a terminal device and a mobile device.

For way of illustration, FIG. 4 shows a schematic diagram illustrating interactions and data flow between a NFC module 19 of the terminal device 10 and a NFC module 29 of the mobile device 20 when carrying out a NFC initiation communication. In a step 81, the NFC module 19 and the associated antenna of the terminal device 10 are powered up such that a respective electromagnetic field (RFID field) is generated (POWER UP). This may be controlled by means of the terminal application 12. Step 81 may also include communicating the initiation data, i.e. the payload of the initiation data, from the terminal application 12 to the driver 14. The initiation data may be provided in an appropriate format such as NDEF (NFC data exchange format). In this regard, during the initiation communication 50, the terminal device 10 may act in the form of a NFC tag or, respectively, NDEF NFC tag.

In a step 82, the NFC module 29 and the associated antenna of the mobile device 20 are powered up such that a respective electromagnetic field (RFID field) is generated (POWER UP). This may be controlled by means the transaction application 22 or the operating system 25. In this way, the mobile device 20 may be set to the listening or scanning mode. It is pointed out that, deviating from FIG. 4, the step 82 may also be performed before the step 81.

By tapping the mobile device 20 (step 125, TAP) such that the mobile device 20 is brought into close proximity to the terminal device 10, an electromagnetic coupling between the antennas of the NFC modules 19, 29, and therefore a field interference occurs. This makes it possible in a step 83 on the side of the terminal device 10 to detect a scanning device, i.e. in the present case the mobile device 20 (DETECTED). The detection may be carried out or, respectively, evaluated by means of the terminal application 12.

As further shown in FIG. 4, in a step 130, data signals are provided by the NFC module 19 such that the initiation data may be transmitted from the terminal device 10 to the mobile device 20 (DATA). As indicated above, the initiation data or, respectively, the payload of the same may be provided and transmitted in the NDEF format. Transmitting the initiation data is carried out on the basis of electromagnetic induction. In this respect, the NFC module 19 is driven in such a way by means of the driver 14 of the terminal device 10 that current, or respectively, voltage changes occur in the antenna of the NFC module 29 (load modulation). In this way, data signals and thus the initiation data may be transmitted from the terminal device 10 to the mobile device 20. It is pointed out that driving the NFC module 19 for providing the data signals may be carried out for a time interval, e.g. starting from the step 81. In this way, the data transmission from the terminal device 10 to the mobile device 20 (step 130) may, deviating from FIG. 4, occur as soon as the mobile device 20 is tapped (step 125).

In a step 85, the received data signals and thus the received initiation data is subjected to further processing in the mobile device 20 (DATA). In a step 84, it may be determined by means of the terminal device 10 or, respectively, the terminal application 12 that the initiation data was sent to the mobile device 20 (DATA SENT). In a step 86, the mobile device 20 is removed from the terminal device 10 (REMOVE). This has the effect, that the electromagnetic coupling between the antennas of the NFC modules 19, 29 and the field interference vanishes (step 87, GONE), which may be detected and evaluated (step 88, GONE) by means of the terminal device 10 or, respectively, the terminal application 12.

The usage of NFC makes it therefore possible to detect by means of the terminal device 10 or, respectively, the terminal application 12 when the mobile device 20, after the scanning and the transmission of the initiation data was carried out, is again removed from the terminal device 10. In the diagrams of FIGS. 2, 3 (and other diagrams), this detection is illustrated by means of a step 150 (SCANNED).

Apart from NFC, also other communication technologies may be applied in order to carry out the initiation communication 50 between the terminal device 10 and the mobile device 20, as described in the following.

In a further embodiment, the initiation communication 50 between the terminal device 10 and the mobile device 20 is carried out by means of visible light communication (VLC). In this embodiment, the terminal device 10 may comprise a communication means connected to the communication driver 14 which is configured for emitting light signals. For this purpose, e.g. a light emitting diode (LED) or display may be applied (not depicted). The mobile device 20 may comprise a communication means configured to receive light signals. For this purpose, the mobile device 20 may e.g. comprise a photodiode, or a camera of the mobile device 20 may be used (not depicted). With regard to the initiation communication 50, the mobile device 20 may be brought into close proximity to the terminal device 10, and the initiation data may be transmitted by emitting respective light signals from the light emitting communication means of the terminal device 10 which may be detected and received by the light receiving communication means of the mobile device 20. The light signals may be provided, on the basis of a respective modulation, in such a way that they cannot be noticed by the human eye.

In another possible embodiment, the initiation communication 50 between the terminal device 10 and the mobile device 20 is carried out by means of acoustic communication. In this embodiment, the terminal device 10 may comprise a communication means connected to the communication driver 14 which is configured for emitting audio signals. For this purpose, the terminal device 10 may comprise a speaker (not depicted). The mobile device 20 may comprise a communication means configured to receive audio signals. For this purpose, e.g. a microphone of the mobile device 20 may be used (not depicted). With regard to the initiation communication 50, the mobile device 20 may be brought into close proximity to the terminal device 10, and the initiation data may be transmitted by emitting respective audio signals from the audio emitting communication means of the terminal device 10 which may be detected and received by the audio receiving communication means of the mobile device 20.

In contrast to NFC, using VLC or acoustic communication does not provide the possibility to detect, by means of the terminal device 10, when the mobile device 20, after the transmission of the initiation data was carried out, is again removed from the terminal device 10. Consequently, the step 150 illustrated in the diagrams of FIGS. 2, 3 (and other diagrams) is not present with regard to these communication schemes.

In the following, possible embodiments and variants of the electronic transaction method are specifically described. In this regard, it is pointed out that features, aspects and details, which are already described above, are not described again in detail below. With regard to this, reference is made to the above description. It is furthermore pointed out that features, aspects and details which are described in the following with regard to an embodiment of the method may also apply in relation to another embodiment, and that features and details of two or more embodiments may be combined with each other.

Figure 5:
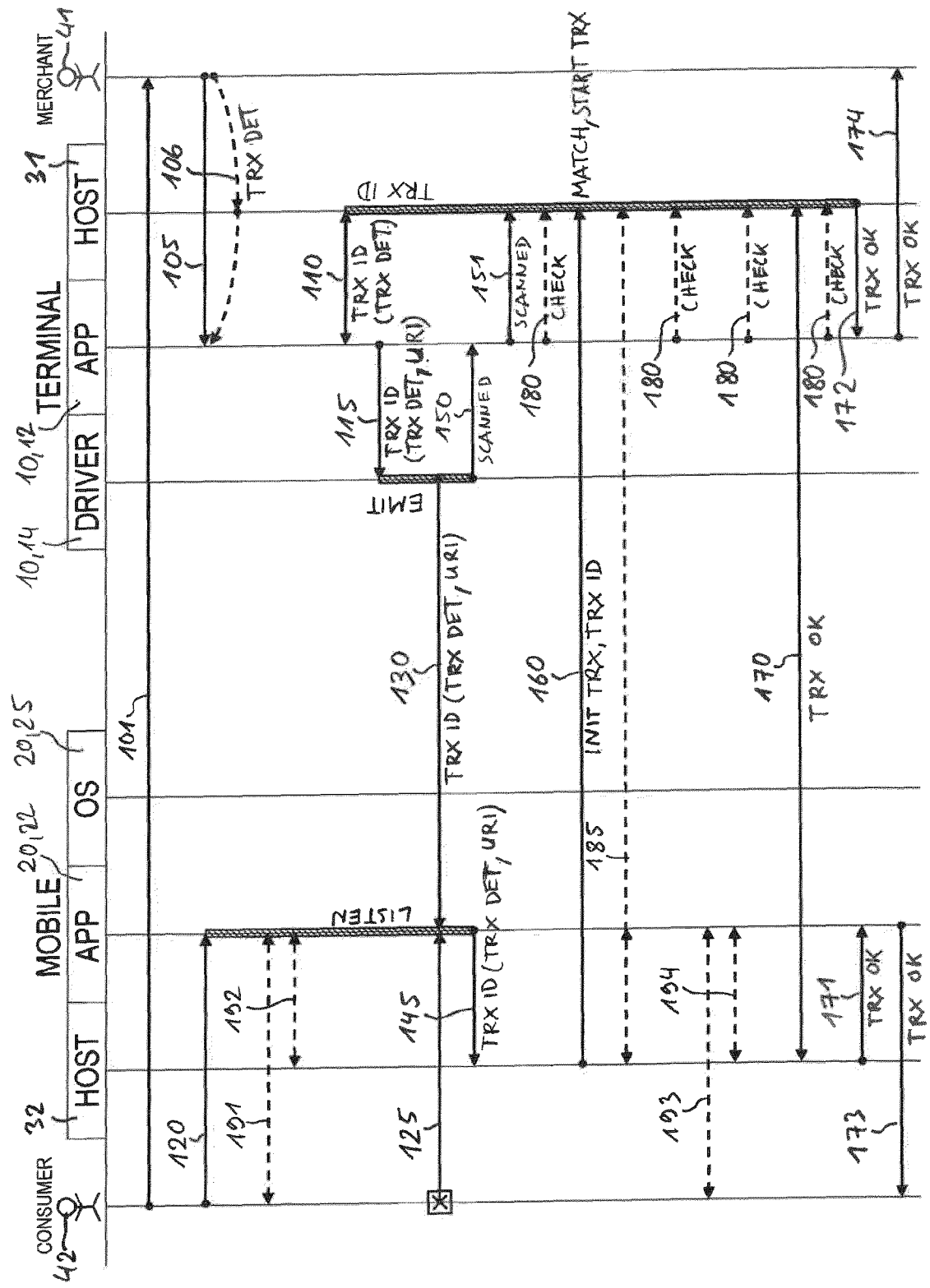
FIG. 5 shows a schematic diagram illustrating interactions and data flow when carrying out an electronic transaction method with the participation of a terminal device, a mobile device, a terminal device and a mobile host, wherein receiving of initiation data is carried out by means of a transaction application of the mobile device.

FIG. 5 shows a schematic diagram illustrating interactions and data flow when carrying out the electronic transaction method according to a possible embodiment. In this embodiment, the scanning or, respectively, receiving of the initiation data is, corresponding to FIG. 2, controlled and carried out by means of the transaction application 22 of the mobile device 20. FIG. 5 furthermore represents a so-called "checkout" case in which transaction details with regard to the electronic transaction are known and may be defined before the initiation communication 50 is carried out.

According to FIG. 5, a communication step 101 is carried out at the beginning between the user 42 of the mobile device 20 and the user 41 of the terminal device 10 in which the user 42 expresses that he or she wants to carry out the electronic transaction (e.g. a payment) by using the mobile device 20 or, respectively, the transaction application 22. In response to that, the user 41 interacts with the terminal device 10 and thus the terminal application 12 in a step 105, such that features like a transaction type (in this case usage of the mobile device 20 or of the transaction application 22) and transaction details (TRX DET) related to the electronic transaction are defined. With regard to a payment, the transaction details may e.g. relate to the goods to be acquired, the prices of the goods and the total amount to be paid.

This is followed by a step 110 in which the terminal application 12 and the terminal host 31 communicate with each other, and in which a transaction identifier (TRX ID) related to the electronic transaction is provided. Providing the transaction identifier may be carried out by means of the terminal application 12, by means of the terminal host 31, or by means of the application 12 and the host 31 together. The transaction identifier is furthermore stored and retained on the terminal host 31, as indicated in FIG. 5 by means of a verticality extending hatched stripe. The step 110 may include transmitting the transaction details (TRX DET), in this case from the terminal application 12 to the terminal host 31. FIG. 5 furthermore illustrates an optional step 106 in which the transaction details are defined with the participation of the terminal host 31. The step 106 may include a scanning operation of the user 41 with a scanner or, respectively, barcode scanner associated with the terminal device 10 (not depicted) such that the transaction details may be provided by means of the host 31 on the basis of scanning information communicated to the host 31.

In a step 115, the terminal application 12 activates the communication driver 14 and transmits the initiation data to be communicated to the mobile device 20 to the driver 14. As shown in FIG. 5, the initiation data comprises (at least) the transaction identifier (TRX ID), and may comprise additional data such as the transaction details (TRX DET) and one or several other identifiers in the form of uniform resource identifiers (URI). In this regard, a possible uniform resource identifier is an identifier or, respectively, address identifier related to the terminal host 31. Another possible example is an application identifier related to the transaction application 22 or a different transaction application. In response to the step 115, the driver 14 drives the communication means of the terminal device 10 such that the initiation data may be emitted or, respectively, transmitted from the terminal device 10 to the mobile device 20 in a step 130.

On the side of the mobile device 20, the user 42 opens the transaction application 22 and, as the case may be, additionally activates the scanning mode of the mobile device 20 (step 120). Moreover, the user 42 carries out a tapping or, respectively, scanning step 125 such that the initiation data transmitted from the terminal device 10 is received by means of the transaction application 22, in combination with the communication means of the mobile device 20. For the case that the received initiation data comprises a uniform resource identifier related to the application 22 or a different transaction application, this identifier is ignored by means of the application 22 which is already running on the mobile device 20. After the tapping or scanning, the mobile device 20 may be removed by means of the user 42.

Afterwards, as shown in FIG. 5, in a step 145, data comprising at least the transaction identifier (TRX ID) is transmitted from the transaction application 22 to the mobile host 32 associated with the mobile device 20. In the step 145, also other information such as the transaction details (TRX DET) and a uniform resource identifier (URI) related to the terminal host 31 may be communicated to the mobile host 32. In response to that, in a step 160, in which a link or interrelationship may be established between the two hosts 31, 32, the mobile host 32 communicates with the terminal host 31 and transmits the transaction identifier to the terminal host 31 in order to initiate the electronic transaction (INIT TRX). With regard to the step 160, the mobile host 32 may establish the communication with the terminal host 31 on the basis of the uniform resource identifier related to the terminal host 31. The step 160 furthermore comprises that the terminal host 31 compares the stored transaction identifier and the transaction identifier received from the mobile host 32 and, upon determining a match, initiates or starts carrying out the electronic transaction (MATCH, START TRX).

Before that, on the side of the terminal device 10, the terminal application 12 may detect that the data transmission was carried out and that the mobile device 20 was removed (step 150, SCANNED). As described above, this is possible for the case that the initiation communication 50 is carried out by means of NFC. Moreover, information reflecting that the data transmission was carried out and that the mobile device 20 was removed may be communicated from the terminal application 12 to the terminal host 31 in a step 151 (SCANNED).

Upon finalizing the electronic transaction, a respective communication indicating or, respectively, confirming that the transaction was properly carried out (TRX OK) takes place between the two hosts 31, 32 in a step 170. Based on this, respective confirmation communications are carried out between the mobile host 32 and the transaction application 22 of the mobile device 20 (step 171) and between the terminal host 31 and the terminal application 12 of the terminal device 10 (step 172). Moreover, respective confirmations are provided or, respectively, displayed to the users 31, 32 by means of the applications 12, 22 of the two devices 10, 20 (steps 173, 174).

The initiation data transmitted from the terminal device 10 to the mobile device 20 (step 130) may be uniquely assigned to the executed electronic transaction. This may be achieved by including the transaction details (TRX DET) in the initiation data. Moreover, the transaction identifier (TRX ID) used in the method may be a unique transaction identifier related to the electronic transaction. In this regard, the transaction identifier may be provided only once. This condition may relate to a time interval, e.g. a predefined time interval for which it may be assumed that the electronic transaction was finalized before the expiry of the time interval. Another example is a time interval extending to the end of the electronic transaction. This may be e.g. the point of time when the transaction was finalized or, respectively, the point of time when the end of the transaction may be confirmed. With regard to FIG. 5, this may be the step 170. After the expiry of such a time interval, the respective transaction identifier may be used again. The starting point of such a time interval may be e.g. the providing of the transaction identifier, i.e. with regard to FIG. 5 the step 110.

Using such a unique initiation data or, respectively, unique transaction identifier allows to carry out the method with a high security and reliability. Moreover, a plurality of electronic transactions (e.g. with different users 42) may be carried out in a parallel way by means of using a unique transaction identifier for each of the transactions (not depicted).

With regard to providing a uniquely assigned transaction identifier, it is e.g. possible to provide the transaction identifier on the basis of transaction details such that the identifier may include information related to transaction details. Another possible procedure consists in providing the transaction identifier in such a way that the transaction identifier comprises or, respectively, reflects a uniquely assigned number. For further electronic transactions to be carried out, transaction identifiers in the form of other uniquely assigned numbers may be provided. As described above, this may relate to a time interval.

The diagram depicted in FIG. 5 illustrates another security feature, which may be optionally added to the method for the purpose of carrying out a user authentication. In this regard, in a step 191, a communication and interaction may be carried out between the user 42 and the mobile device 20 and thus the transaction application 22, in which the user 42, upon a respective request, verifies the user identity. The step 191 may comprise a user input on the mobile device 20 including e.g. inputting a pin, scanning a fingerprint or taking a picture for facial recognition. It is also possible that, subsequent to step 191, a respective communication is carried out between the transaction application 22 and the mobile host 32 in a step 192. By means of this procedure, it is e.g. possible to secure the opening of the transaction application 22 on the mobile device 20. Consequently, this may be also referred to as pre-authentication.

A user authentication may be carried out alternatively or additionally also at a later stage, as indicated in FIG. 5 by means of the optional steps 193, 194. Step 193, in which a communication and interaction may be carried out between the user 42 and the mobile device 20 may be similar to step

191. Subsequent to step 193, a communication between the transaction application 22 and the mobile host 32 may be carried out in a step 194.

FIG. 5 additionally illustrates optional steps 180, in which the terminal application 12 communicates with the terminal host 31 in order to check the status of the electronic transaction (CHECK). This polling procedure ends when the confirmation is communicated to the terminal application 12 in the step 172.

Moreover, FIG. 5 additionally illustrates by means of an optional step 185 that further possible communications or transaction related dialogue may be carried out between the two hosts 31, 32 and/or between the transaction application 22 and the mobile host 32. The step 185 may relate to a workflow which may be specific for the electronic transaction carried out and/or for the transaction application 22.

Figure 6:
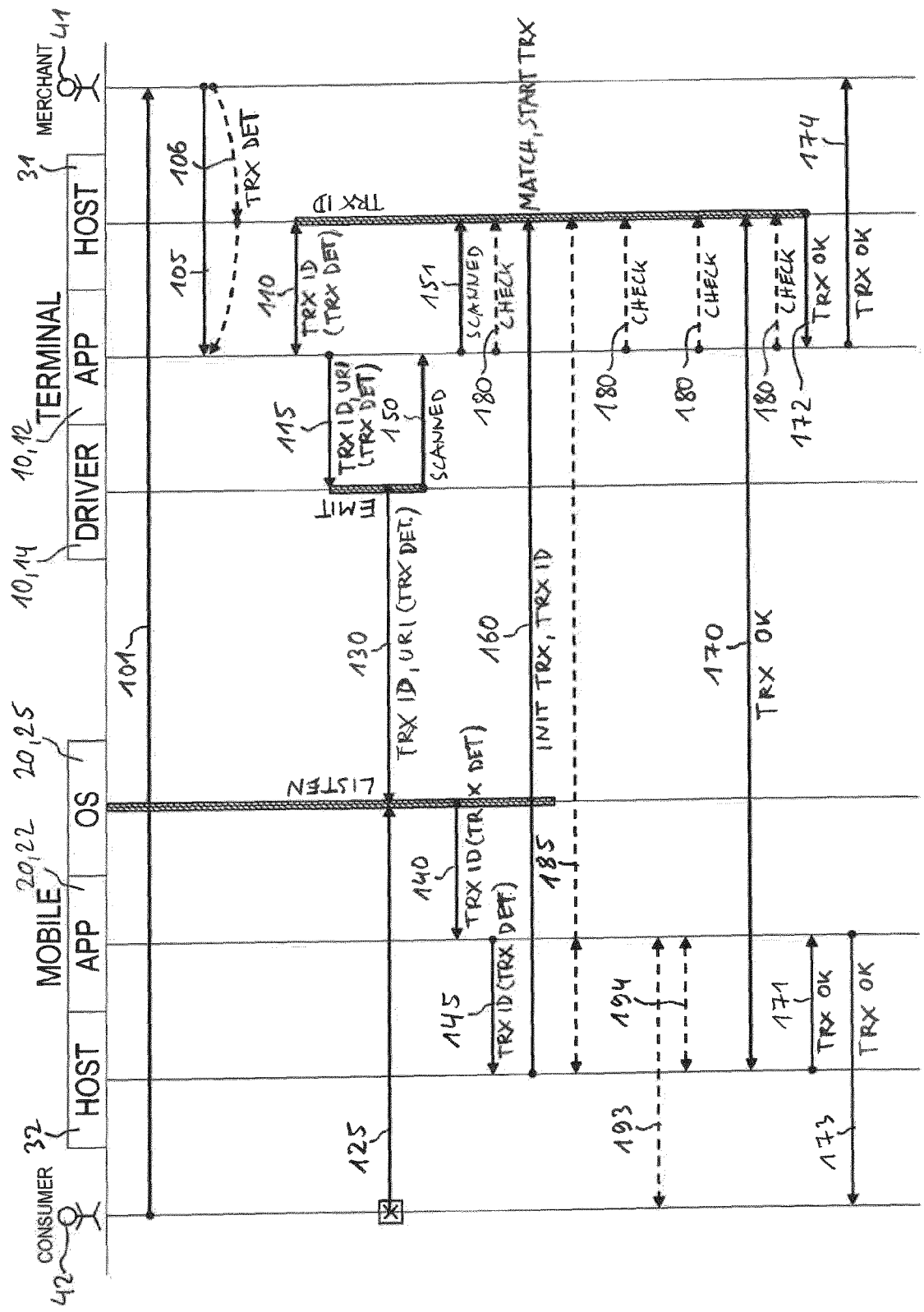
FIG. 6 shows a schematic diagram illustrating interactions and data flow when carrying out an electronic transaction method with the participation of a terminal device, a mobile device, a terminal host and a mobile host, wherein receiving of initiation data is carried out by means of an operating system of the mobile device.

FIG. 6 shows a schematic diagram illustrating interactions and data flow when carrying out the method according to a further embodiment. This embodiment substantially coincides with the embodiment depicted in FIG. 5 and differs from FIG. 5 in that the scanning or, respectively, receiving of the initiation data is, corresponding to FIG. 3, controlled and carried out by means of the operating system 25 of the mobile device 20. The workflow illustrated in FIG. 6 also represents a "check-out" case.

According to FIG. 6, at the beginning, the above-described steps such as steps 101, 105, 106, 110, 115 are carried out. In the step 115, the terminal application 12 activates the communication driver 14 of the terminal device 10 and transmits the initiation data to be communicated to the mobile device 20 to the driver 14. The initiation data comprises data components such as a (uniquely assigned) transaction identifier (TRX ID) and a uniform resource identifier (URI) related to the transaction application 22 of the mobile device. This identifier is referred to as application identifier in the following. Similar to the above description, the initiation data may optionally comprise data such as transaction details (TRX DET) and a uniform resource identifier related to the terminal host 31.

In a subsequent step 130, the driver 14 drives the communication means of the terminal device 10 such that the initiation data may be emitted or, respectively, transmitted from the terminal device 10 to the mobile device 20. On the side of the mobile device 20, the user 42 does not have to open the transaction application 22. The user 42 simply taps the mobile device 20 or, respectively, carries out the scanning (step 125) such that the initiation data transmitted from the terminal device 10 is received by means of the operating system 25, in combination with the communication means of the mobile device 20. Afterwards, in a step 140, the operating system 25 automatically launches the transaction application 22 of the mobile device 20 on the basis of the application identifier comprised in the received initiation data. In the step 140, the operating system 25 furthermore transmits data comprising at least the transaction identifier (TRX ID), and optionally other information such as the transaction details (TRX DET) and the identifier related to the terminal host 31, to the transaction application 22. In response to that, such data is also transmitted from the transaction application 22 to the mobile host 32 associated with the mobile device 20 in a step 145.

Afterwards, as shown in FIG. 6, the same steps 160, 170, 171, 172, 173, 174 as described above are carried out in order to start the electronic transaction and confirm carrying out the same.

For the case that the initiation communication is carried out by means of NFC, the steps 150, 151 may be carried out, as well. Additionally, the optional steps 180, 185, 193, 194 may be carried out within the workflow of FIG. 6. This also applies to the embodiments depicted in the figures following FIG. 6.

Using the application identifier in the initiation data such that, as described above, the transaction application 22 is automatically launched on the mobile device 20, makes it possible to carry out the electronic transaction method in a user-friendly way. In this regard, carrying out the method is also suitable for e.g. visually impaired people.

Figure 7:
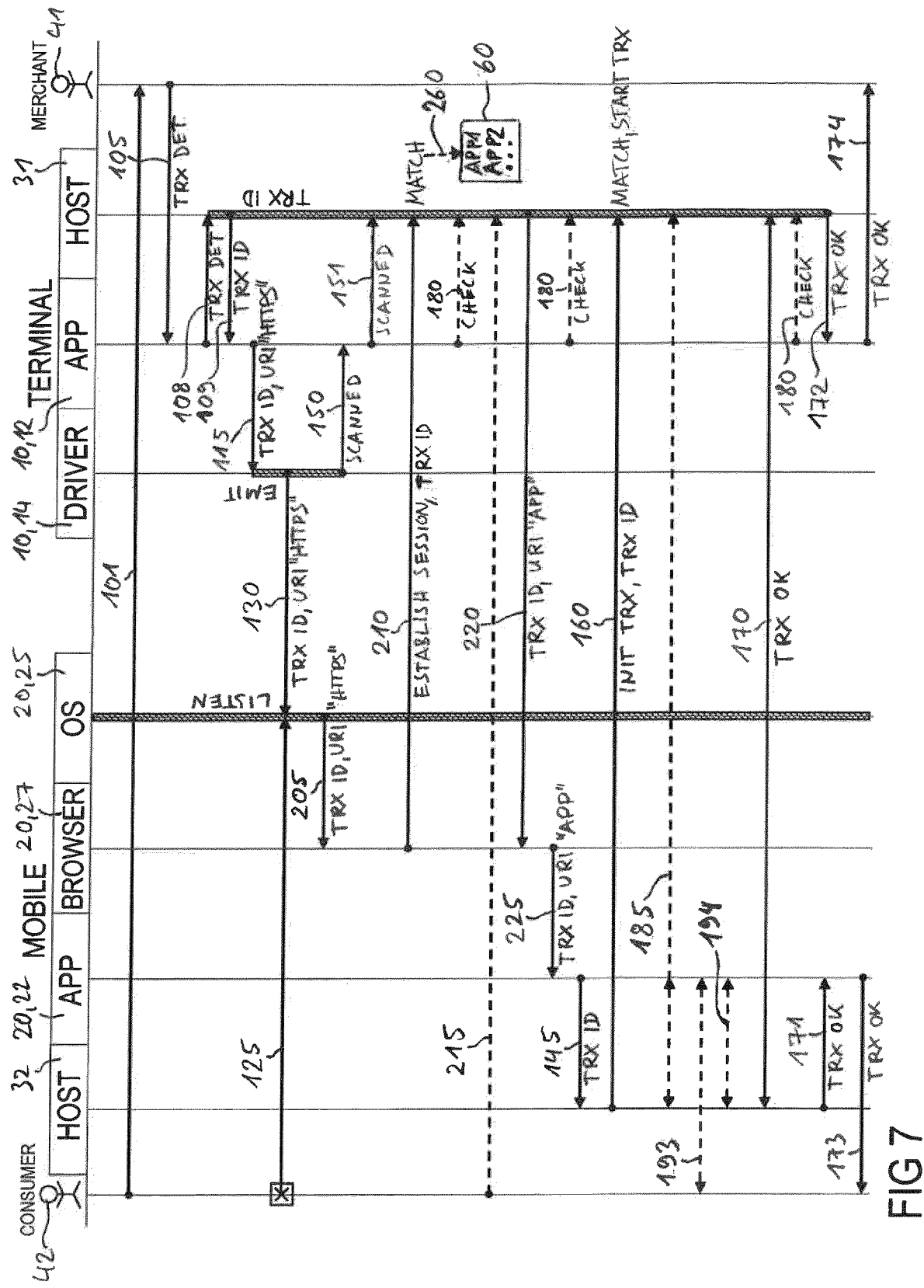
FIG. 7 shows a schematic diagram illustrating interactions and data flow when carrying out an electronic transaction method with the participation of a terminal device, a mobile device, a terminal host and a mobile host, wherein an internet session is established by means of a browser of the mobile device.

FIG. 7 shows a schematic diagram illustrating interactions and data flow when carrying out the method according to a further embodiment. This embodiment, in which a browser 27 of the mobile device 20 is additionally used, also represents a "check-out" case. At the beginning, after a communication step 101 between the users 41, 42 in which the user 42 expresses that he or she wants to carry out the electronic transaction by using the mobile device 20, the user 41 interacts with the terminal device 10 and thus the terminal application 12 in a step 105 such that information like transaction details (TRX DET) related to the electronic transaction are defined. Afterwards, the following communications are carried out between the terminal application 12 and the terminal host 31. In a step 108, the transaction details are transmitted from the application 12 to the host 31 and, in a subsequent step 109, a (unique) transaction identifier (TRX ID) provided by means of the host 31 which relates to the electronic transaction to be carried out is transmitted from the host 31 to the application 12. The transaction identifier is also stored and retained on the terminal host 31.

It is pointed out, that apart from carrying out the steps 108, 109, also another procedure, e.g. a procedure including the steps 106, 110 as described above and illustrated in FIGS. 5, 6, may be applied to the embodiment of FIG. 7. Moreover, the embodiments shown in FIGS. 5, 6 may be adapted in such a way that they comprise, similar to FIG. 7, the steps 108, 109. Such details may also apply to the embodiments shown in the figures following FIG. 7.

With regard to FIG. 7, after the step 109, a step 115 is carried out in which the terminal application 12 activates the communication driver 14 of the terminal device 10 and transmits the initiation data to be communicated to the mobile device 20 to the driver 14.

The initiation data comprises data components such as the transaction identifier (TRX ID) and a uniform resource identifier in the form of an internet address identifier (URI "HTTPS"). The internet address identifier relates to the terminal host 31 and is used in a later stage for establishing an internet session between the mobile device 20 and the terminal host 31.

In a subsequent step 130, the driver 14 drives the communication means of the terminal device 10 such that the initiation data may be emitted or, respectively, transmitted from the terminal device 10 to the mobile device 20. On the side of the mobile device 20, the user 42 taps the mobile device 20 or, respectively, carries out the scanning (step 125) such that the initiation data transmitted from the terminal device 10 is received, in this case, by means of the operating system 25, in combination with the communication means of the mobile device 20.

This is followed by a step 205, in which the operating system 25, on the basis of the received internet address identifier (URI "HTTPS"), automatically launches the browser 27 of the mobile device 20 such that the browser 27 establishes, in a subsequent step 210, an internet session with the terminal host 31 (ESTABLISH SESSION). With regard to this, the operating system 25 transmits the internet address identifier in the step 205 to the browser 27 on the basis of which the browser 27 establishes the internet session with the terminal host 31 in the step 210. Moreover, the steps 205, 210 also comprise transmitting the transaction identifier (TRX ID) from the operating system 25 to the browser 27 and, during the internet session, from the browser 27 to the terminal host 31. The step 210 furthermore comprises that the terminal host 31 compares the stored transaction identifier and the transaction identifier transmitted from the mobile device 20 or, respectively, from the browser 27. Upon determining a match in the step 210 (MATCH), the following may be performed.

In a subsequent step 220, which is also carried out during the internet session, the terminal host 31 transmits data comprising the transaction identifier (TRX ID) and a uniform resource identifier or, respectively, application identifier related to the transaction application 22 (URI "APP") to the browser 27. The browser 27, upon receiving such data, automatically launches the transaction application 22 of the mobile device 20 on the basis of the application identifier and transmits the transaction identifier to the transaction application 22 in a step 225. Afterwards, the transaction application 22 communicates with the mobile host 32 in a step 145 in which the transaction identifier is transmitted from the transaction application 22 to the mobile host 32. Subsequently, the same steps 160, 170, 171, 172, 173, 174 as described above are carried out in order to start and confirm carrying out the electronic transaction. Likewise, the steps 150, 151 and the optional steps 180, 185, 193, 194 may be carried out within the workflow of FIG. 7. Similar to the above description, it is also possible that data reflecting the transaction details is communicated to the mobile host 32.

Using the browser 27 of the mobile device 20 in the method according to FIG. 7 offers the additional possibility to select the transaction application 22 from a plurality of available transaction applications. According to a possible variant, such a selection may be optionally carried out by means of the user 42 of the mobile device 20.

For this purpose, during the internet session, an internet or, respectively, web page 60 indicating the plurality of available transaction applications (APP1, APP2, . . . ) is displayed on the mobile device 20 by means of the browser 27, as indicated in FIG. 7 by means of an optional step 260. This may be initiated by means of the terminal host 31 upon determining the match between the stored transaction identifier and the transaction identifier transmitted from the mobile device 20 in the step 210 (MATCH). In response to that, the user 42 may select one of the displayed transaction applications by means of a respective user input on the mobile device 20, and information related to the user input is transmitted to the terminal host 31, as indicated in FIG. 7 by means of an optional step 215. Transmitting such information to the mobile host 31 may be carried out by means of the browser 27. Upon that, the mobile host 31 takes into account or, respectively, processes the user input and, on the basis of this, transmits data comprising the application identifier related to the selected transaction application 22 (URI "APP") to the browser 27 in the step 220. Afterwards, the above described further steps are carried out.

It is alternatively possible that the selection of the transaction application 22 from a plurality of available transaction applications is carried out automatically by means of the terminal host 31. With regards to this, available data such as e.g. user preferences, browser cookies, an identifier related to the mobile device 20, a launching application etc. may be taken into account by the terminal host 31. The selection may be carried out upon determining the match between the stored transaction identifier and the transaction identifier transmitted from the mobile device 20 in the step 210 (MATCH). Upon that, the mobile host 31 transmits data comprising the application identifier related to the automatically selected transaction application 22 (URI "APP") to the browser 27 in the step 220. Subsequently, the above described further steps are carried out.

Figure 8:
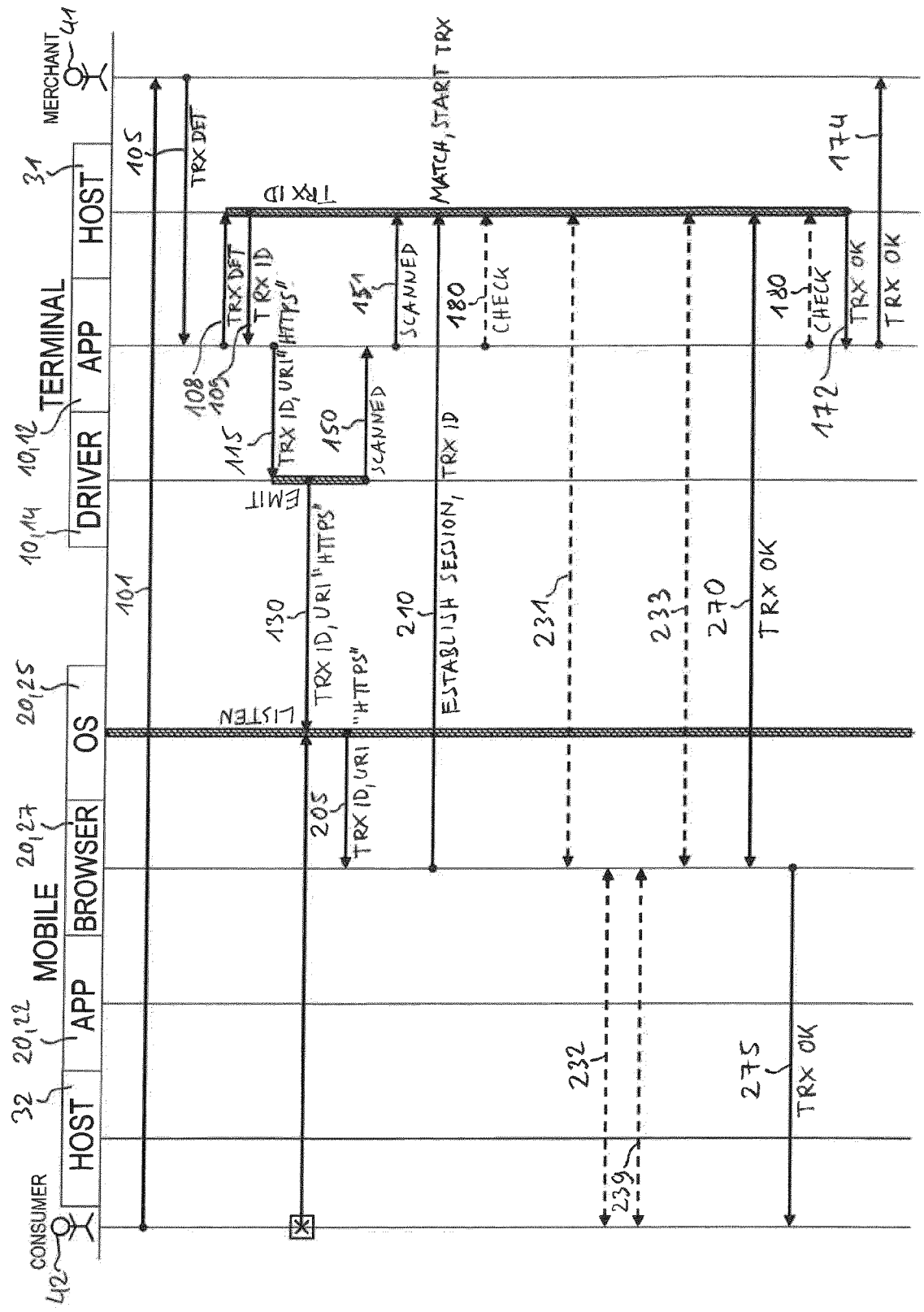
FIG. 8 shows a schematic diagram illustrating interactions and data flow when carrying out an electronic transaction method with the participation of a terminal device, a mobile device and a terminal host, wherein an internet session is established by means of a browser of the mobile device.

FIG. 8 shows a schematic diagram illustrating interactions and data flow when carrying out a further embodiment of the method. This embodiment also represents a "check-out" case in which a browser 27 of the mobile device 20 is applied. In the method, above-described steps such as steps 101, 105, 108, 109, 115, 130 and 205 are carried out. In a subsequent step 210, the browser 27 (which is launched in the previous step 205) establishes an internet session with the terminal host 31 (ESTABLISH SESSION) on the basis of the transmitted internet address identifier (URI "HTTPS") related to the terminal host 31. The step 210 also comprises transmitting the (unique) transaction identifier (TRX ID) from the browser 27 of the mobile device 20 to the terminal host 31 which, upon determining a match between the stored transaction identifier and the transaction identifier transmitted from the mobile device 20, initiates or starts carrying out the electronic transaction (MATCH, START TRX)

Upon finalizing the electronic transaction, a respective communication indicating or, respectively, confirming that the transaction was properly carried out (TRX OK) takes place between the terminal host 31 and the browser 27 of the mobile device 20. A respective confirmation is also provided or, respectively, displayed to the user 42 by means of the browser 27 of the mobile device 20 in a step 275. On the side of the terminal device 10, respective confirmations are also communicated to the terminal application 12 and to the user 41 in steps 172, 174.

The workflow illustrated in FIG. 8 represents a simple embodiment of the method which is carried out without the participation of a mobile host 32. Moreover, as indicated in FIG. 8 by means of optional steps 231, 232, 233, further possible communications, transaction related dialogue and/or interactions may be carried out between the terminal host 31 and the browser 27 and/or between the browser 27 and the user 42, which may be specific for the electronic transaction carried out. In this regard, it is also possible to carry out such steps 231, 232, 233 by means of progressive web application (PWA) technology. FIG. 8 furthermore depicts an optional step 239 indicating an interaction between the user 42 and the browser 27. The step 239 may comprise carrying out a user input (e.g. inputting a pin, scanning a fingerprint or taking a picture for facial recognition) such that a user authentication may be carried out.

Figure 9:
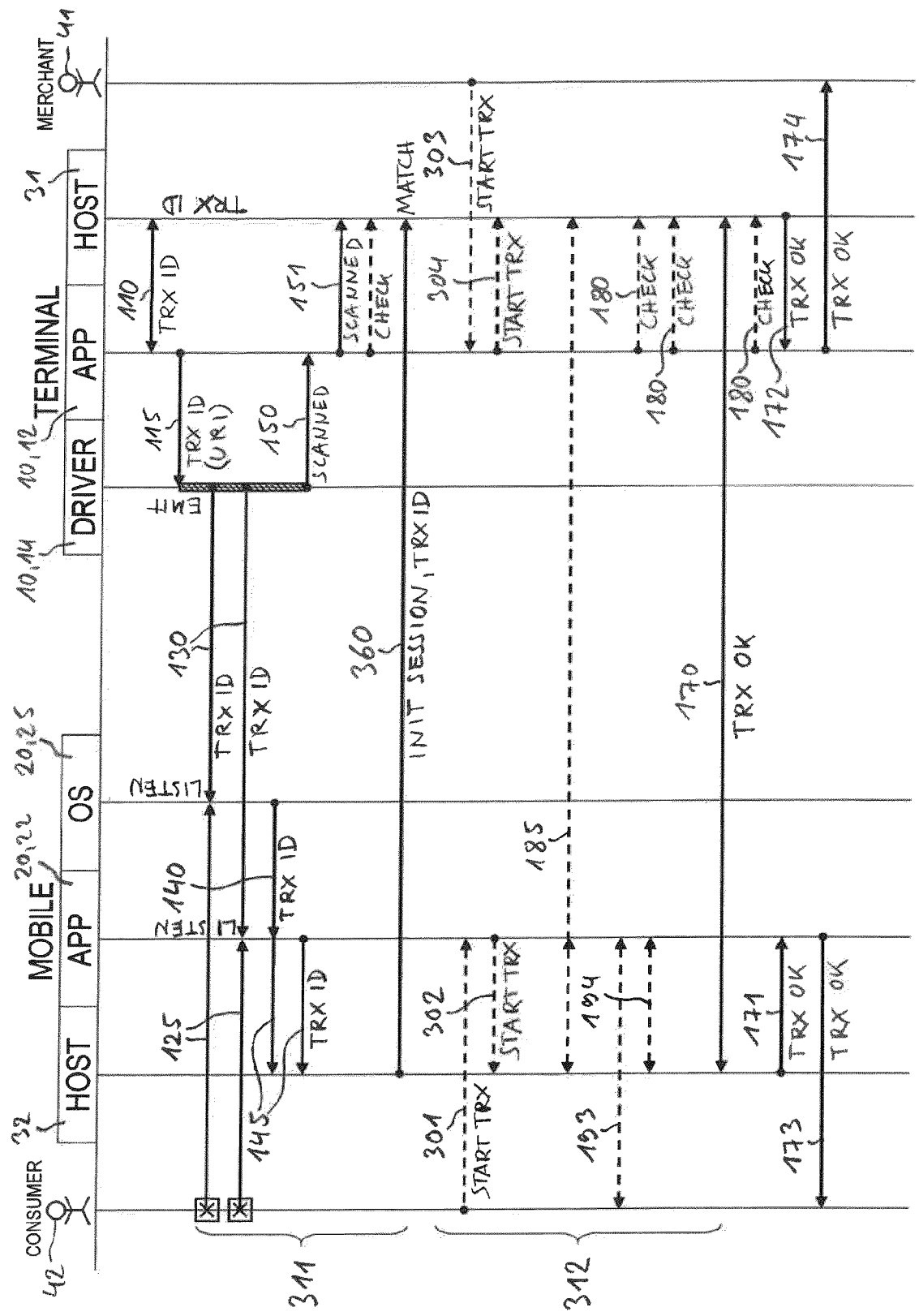
FIG. 9 shows a schematic diagram illustrating interactions and data flow when carrying out an electronic transaction method with the participation of a terminal device, a mobile device, a terminal host and a mobile host, wherein a check-in case is illustrated.

Apart from a "check-out" case, the electronic transaction method or, respectively, embodiments of the same may also be applied with regard to a "check-in" case in which transaction details with regard to the electronic transaction to be carried out may not yet be known or completely known before carrying out the initiation communication 50. Instead of this, the transaction details may be completely defined and, as the case may be, communicated to the terminal host 31 at a later point of time By way of illustration, FIG. 9 shows a schematic diagram illustrating interactions and data flow when carrying out an embodiment of the method adapted to a "check-in" case. FIG. 9 represents variations of the embodiments shown in FIGS. 5, 6. As further indicated in FIG. 9 by means of brackets, respective phases 311, 312 may be assigned to the workflow, wherein in a phase 311, a link or, respectively, session may be established, and in a subsequent phase 312, the actual electronic transaction may be carried out.

As shown in FIG. 9, at the beginning, a communication takes place between the terminal application 12 of the terminal device 10 and the terminal host 31 in which a (unique) transaction identifier (TRX ID) related to the electronic transaction to be carried out (in the future) is provided (step 110). This may be carried out by means of the terminal application 12, by means of the terminal host 31, or by means of the application 12 and the host 31 together. The transaction identifier is furthermore stored and retained on the terminal host 31.

In a step 115, the terminal application 12 activates the communication driver 14 of the terminal device 10 and transmits the initiation data (which are to be communicated to the mobile device 20) to the driver 14. In this regard, it is pointed out that the user 42 and the mobile device 20 may not yet be known on the side of the terminal device 10. The initiation data transmitted to the driver 14 comprises the transaction identifier and, as the case may be, one or several uniform resource identifiers (URI) related to e.g. a transaction application 22 and the terminal host 31. In a subsequent step 130, the driver 14 drives the communication means of the terminal device 10 such that the initiation data may be emitted or, respectively, transmitted from the terminal device 10.

On the side of the mobile device 20, the user 40 acts as described above with regard to FIGS. 5, 6 and (at least) carries out the tapping or, respectively, scanning step 125 such that the initiation data transmitted from the terminal device 10 is received by means of either the operating system 25 or the transaction application 22, in combination with the communication means of the mobile device 20. Depending on the embodiment, the operating system 25 either launches the transaction application 22 and the transaction identifier is transmitted from the operating system 25 to the launched transaction application 22 and from the application 22 to the mobile host 32 (steps 140, 145, similar to FIG. 6), or the transaction application 22 transmits the transaction identifier to the mobile host 32 (step 145, similar to FIG. 5).

This is followed by a step 360 in which the mobile host 32 communicates with the terminal host 31 and transmits the transaction identifier to the terminal host 31 in order to initiate establishing a link or interrelationship referred to as transaction session in the following (INIT SESSION). In the step 360, similar to the above description, the mobile host 32 may carry out the communication with the terminal host 31 on the basis of a uniform resource identifier related to the terminal host 31. Within the step 360, the terminal host 31 also compares the stored transaction identifier and the transaction identifier received from the mobile host 32, and may therefore determine a match (MATCH). The (future) electronic transaction is only carried out under the condition that the match is determined by the terminal host 31.

According to the workflow of FIG. 9, the initiation to carry out the electronic transaction is either effected on the side of the mobile device 20 or on the side of the terminal device 10. In the former case, a communication or, respectively, interaction related to e.g. a user input takes place in a step 301 between the user 42 and the transaction application 22 of the mobile device 20, and information regarding this is communicated to the mobile host 32 in a step 302 (START TRX). It is also possible that such information is communicated from the mobile host 32 to the terminal host 31 (e.g. within the step 185). In the latter case, a communication or, respectively, interaction related to e.g. a user input takes place in a step 303 between the user 41 and the terminal application 12 of the terminal device 10, and information regarding this is communicated to the terminal host 31 in a step 304 (START TRX). On the basis of such input, the terminal host 31 may initiate or start carrying out the electronic transaction (not depicted). Before that, corresponding transaction details may be communicated to the terminal host 31 (e.g. within the step 304 and/or the step 185). Upon finalizing the electronic transaction, respective confirmation communications are carried out (steps 170, 171, 172, 173, 174, TRX OK).

Figure 10:
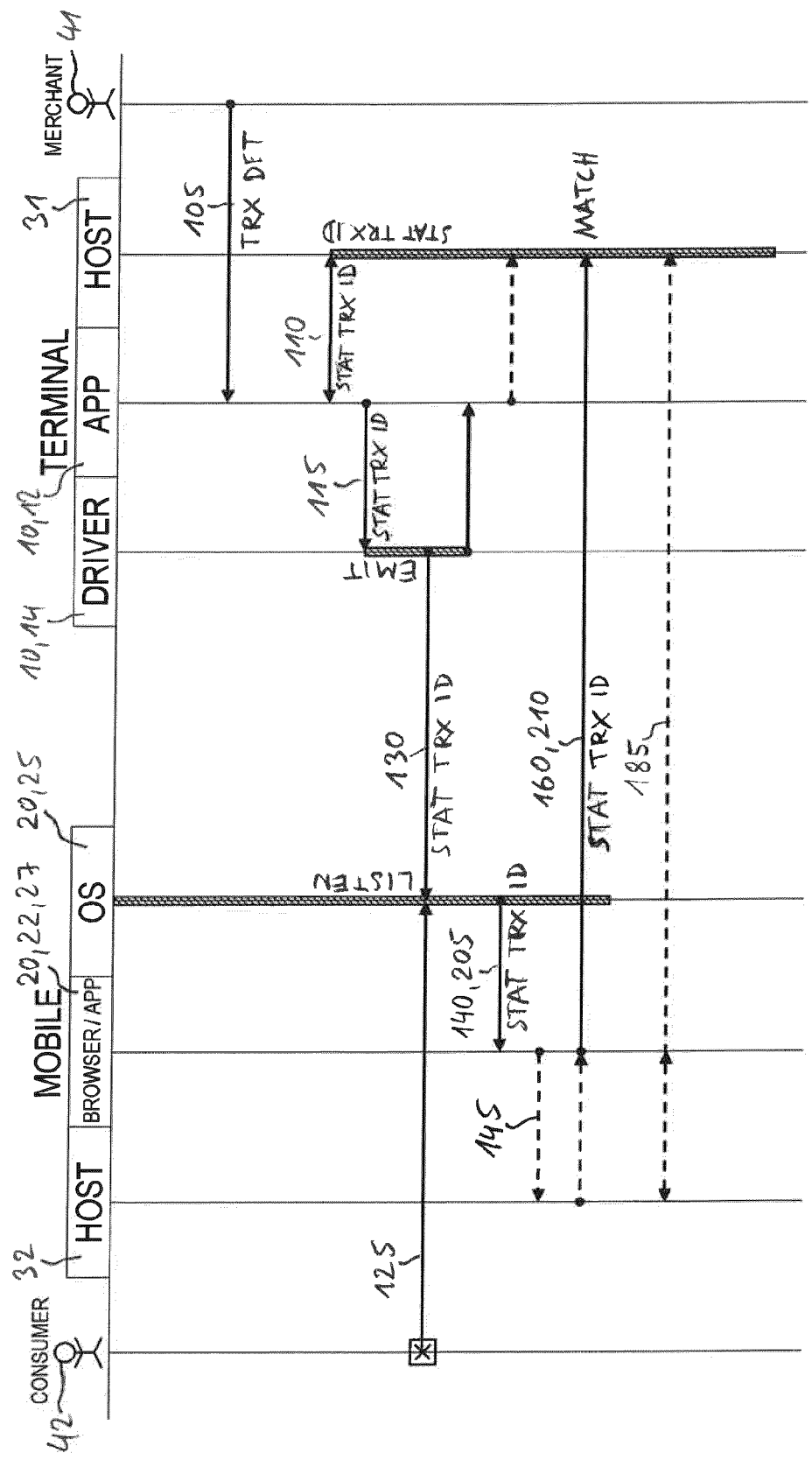
FIG. 10 shows a schematic diagram illustrating interactions and data flow when carrying out an electronic transaction method with the participation of a terminal device, a mobile device, a terminal host and a mobile host, wherein static initiation data is used.

It is pointed out that a "check-in" scenario may also be applied with regard to other embodiments of the electronic transaction method described here. In this respect, such embodiments may be adapted to the "check-in" case in such a way that the terminal host 31, upon determining a match between the stored transaction identifier and the transaction identifier transmitted from the mobile device 20 or, respectively, from the mobile host 31, does not yet start the electronic transaction. Similar to FIG. 9, the initiation to start the electronic transaction may be linked to a communication or interaction taking place on the side of the mobile device 20 or on the side of the terminal device 10. Another variant of the method consists in not using unique initiation data or, respectively a unique transaction identifier but instead static initiation data. This means that the initiation data is not uniquely assigned and related to the electronic transaction to be carried out but instead, for different transactions, always the same initiation data is used. By way of illustration, FIG. 10 depicts a schematic diagram illustrating interactions and data flow when carrying out another embodiment of the method in which static initiation data is applied FIG. 10 represents variations of the embodiments depicted in FIGS. 5, 6, 7, 8. In the method, steps such as the above-described steps 105, 110, 115 and 130 are carried out but with the difference that a static transaction identifier (STAT TRX ID) is provided in the step 110 and transmitted in the subsequent steps 115, 130. The static transaction identifier which is also stored on the terminal host 31 may e.g. relate to the terminal device 10, and may therefore be a terminal identifier.

On the side of the mobile device 20, the user 42 taps the mobile device 20 or, respectively, carries out the scanning (step 125) such that the initiation data, i.e. the static transaction identifier transmitted from the terminal device 10 is received by the mobile device 20. This may be realized by means of the operating system 25 or the transaction application 22, in combination with the communication means of the mobile device 20. The received static transaction identifier may subsequently be transmitted to the mobile host 32 (steps 140, 145) which in turn may transmit the static transaction identifier to the terminal host 31 in order to initiate carrying out the transaction (step 160). Upon determining a match between the stored static transaction identifier and the static transaction identifier received from the mobile host 32, the terminal host 31 may start carrying out the electronic transaction. With regard to this and further processes which may be carried out afterwards, reference is made to the above description.

Alternatively, a browser 27 of the mobile device 20 may be involved to which the static transaction identifier may be transmitted (step 205). Based on this, the browser 27 may establish an internet session with the terminal host 31 in which the browser 27 transmits the static transaction identifier to the terminal host 31. In this regard, it is pointed out that apart from the static transaction identifier, the initiation data transmitted in the step 130 may additionally comprise an internet address identifier on the basis of which the browser 27 may establish the internet session with the terminal host 31. Upon determining a match between the stored static transaction identifier and the static transaction identifier received from the browser 27, the method may be continued as described above, e.g. by means of transmitting an application identifier, in this case together with the static transaction identifier, from the terminal host 31 to the browser 27 of the mobile device 20. With regard to this and further processes which may be carried out afterwards, reference is made to the above description. In this regard, it is pointed out that such processes are carried out using the static transaction identifier.

It is furthermore pointed out that the usage of a static transaction identifier may be also considered with regard to other embodiments of the method described here, e.g. embodiments described in the following.

Concerning embodiments of the method described above, a communication between the mobile device 20 and another participant (e.g. the mobile host 32 or the terminal host 31) may be carried out at least in part via a mobile internet connection of the mobile device 20. However, it is also possible that the mobile device 20 is "offline" because no mobile internet connection is available for the mobile device 20. In such a scenario, a local wireless connection may be established between the mobile device 20 and the terminal device 10 subsequent to the initiation communication 50 such that the mobile device 20 may use an internet connection of the terminal device 10 for carrying out a communication with another participant.

Figure 11:
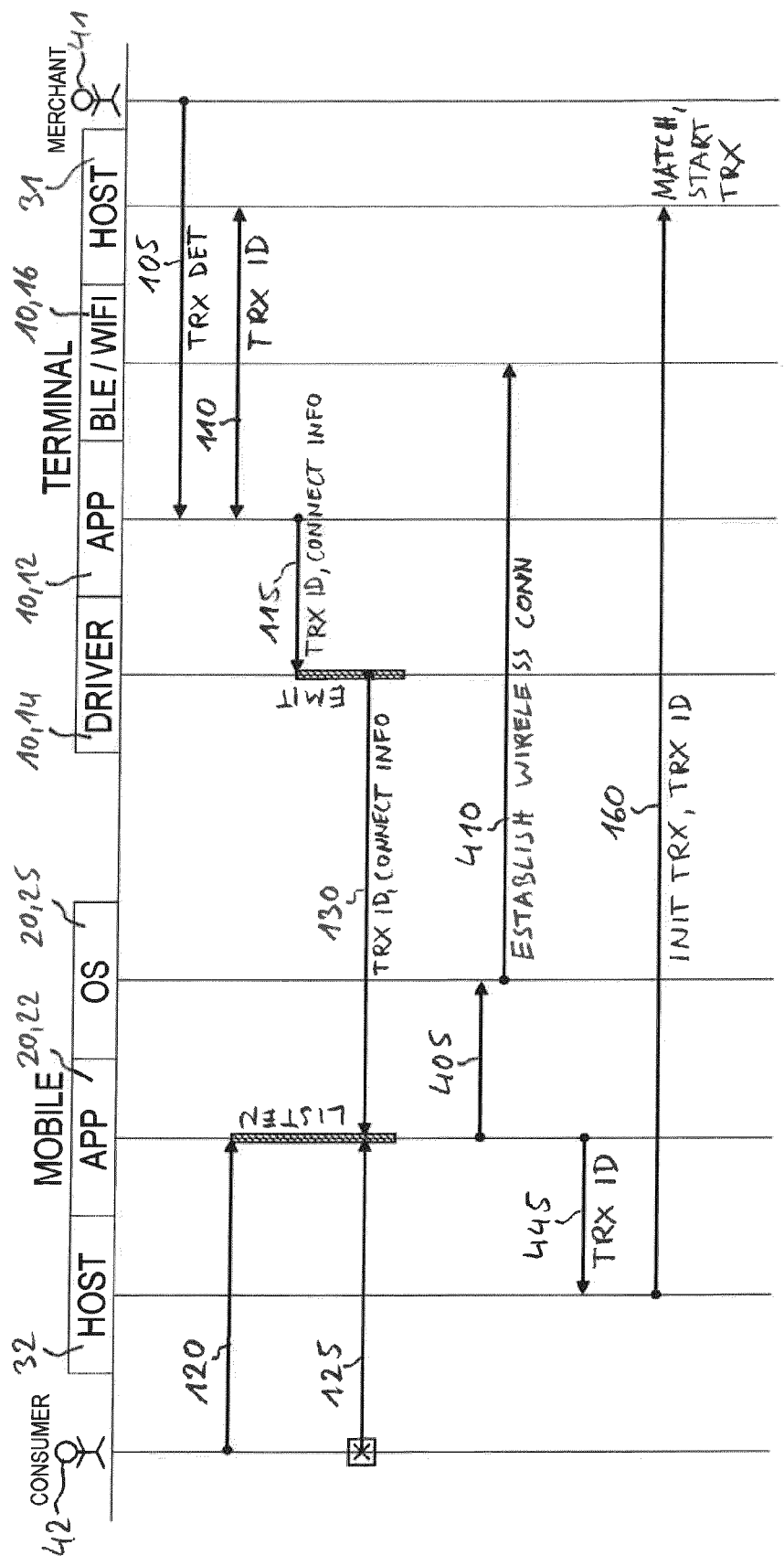
FIG. 11 shows a schematic diagram illustrating interactions and data flow when carrying out an electronic transaction method with the participation of a terminal device, a mobile device, a terminal host and a mobile host, wherein a wireless connection is established between the terminal device and the mobile device via which the mobile device communicates with the mobile host.

By way of illustration, FIG. 11 shows a schematic diagram illustrating interactions and data flow when carrying out an embodiment of the method adapted to an "offline" case. FIG. 11 represents a variation of the embodiment shown in FIG. 5. In the method, steps such as the above-described steps 105, 110, 115, 130 are carried out but with the difference that connection information (CONNECT INFO) is additionally comprised in the initiation data transmitted in the steps 115, 130. The connection information relates to establishing a wireless connection or, respectively, local wireless connection between the terminal device 10 and the mobile device 20 different from the initiation communication 50. This means that a different communication technology is applied. The connection information may relate to establishing a BLE-connection (bluetooth low energy) or a Wi-Fi-connection.

On the side of the mobile device 20, the user 42 opens the transaction application 22 (step 120) and carries out the step 125 such that the initiation data comprising the connection information is received by means of the application 22, in combination with the communication means of the mobile device 20. This is followed by a step 405 in which the transaction application 22 initiates the operating system 25 of the mobile device 20 to establish a wireless connection with the terminal device 10 in a step 410 (ESTABLISH WIRELESS CONN). Establishing the wireless connection is based on the received connection information. Moreover, on the side of the terminal device 10, for establishing the wireless connection, a communication module 16 configured for the respective type of wireless connection (BLE or a Wi-Fi) is used. This may also apply to the mobile device 20 (not depicted).

Afterwards, steps as described above may be carried out such as transmitting the (unique) transaction identifier from the transaction application 22 to the mobile host 32. In FIG. 11, this procedure is indicated by means of a step 445. In the step 445, transmitting the transaction identifier is carried out via the established local wireless connection between the terminal device 10 and the mobile device 20, and via the internet connection of the terminal device 10. In this regard, the terminal device 10 is used as an intermediary connection means. Afterwards, the method may be continued as described above, i.e. the step 160 as shown in FIG. 11 may be carried out which may be followed by other steps.

It is pointed out that establishing a wireless connection between the terminal device 10 and the mobile device 20 may be also considered with regard to other embodiments of the method described here. In this respect, also other information or data may be transmitted from or to the mobile device 20, or other communications may be established via the wireless connection and the internet connection of the terminal device 10. An example is establishing an internet session between a browser 27 of the mobile device 20 and the terminal host 31, as described above. In this regard, it may also be considered that the operating system 25, when being applied to receive the initiation data (in combination with the communication means of the mobile device 20), upon receiving connection information related to establishing a wireless connection, automatically establishes such a wireless connection with the terminal device 10.

Figure 12:
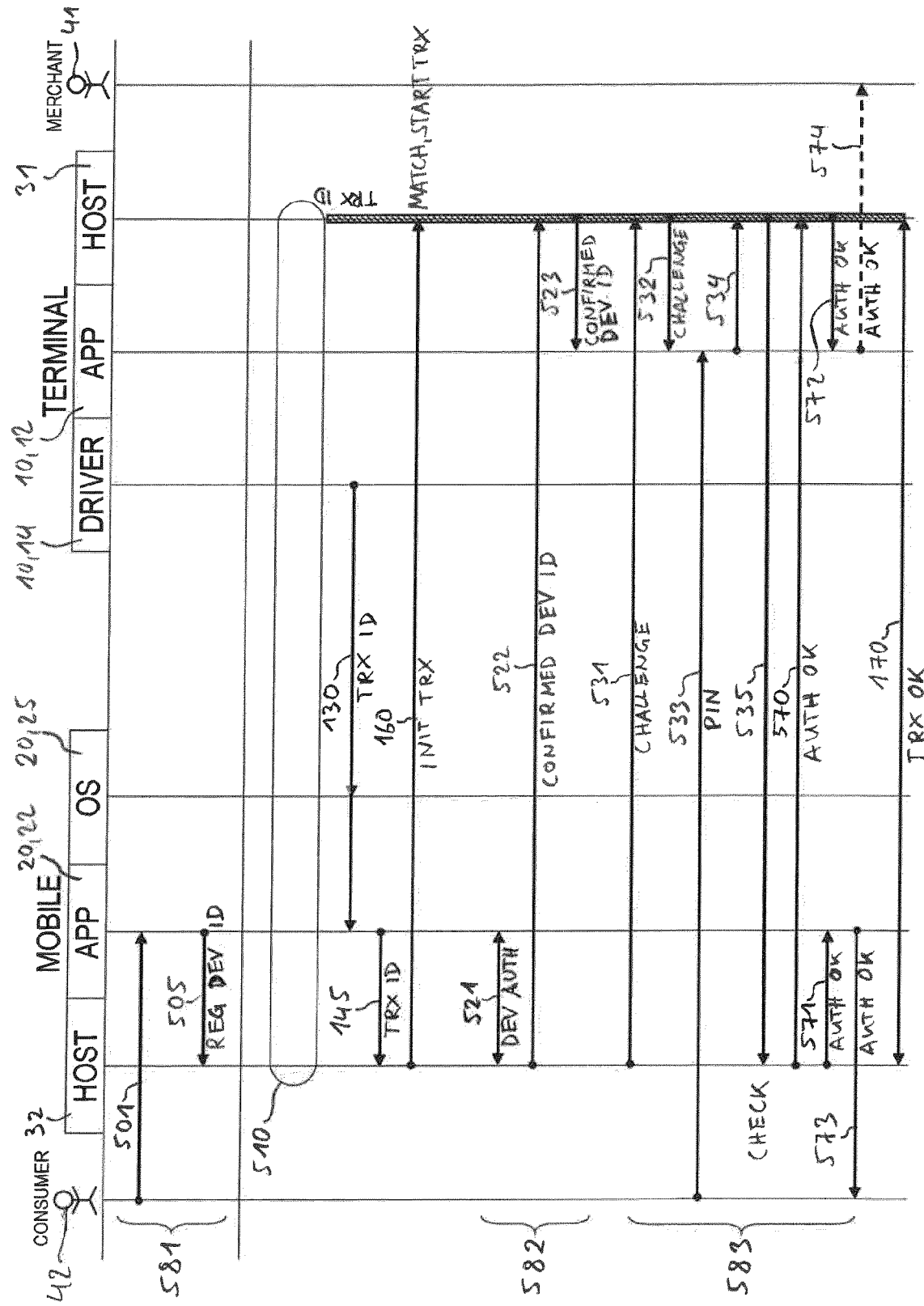
FIG. 12 shows a schematic diagram illustrating interactions and data flow when carrying out a two-factor authentication with the participation of a terminal device, a mobile device, a terminal host and a mobile host.

Another variant of the electronic transaction method consists in embedding a two-factor authentication scheme. In this way, a high degree of security may be achieved. A possible embodiment which may be considered is depicted in the diagram shown in FIG. 12. As indicated in FIG. 12 by means of brackets, respective phases 581, 582, 583 may be assigned to the workflow, wherein the phase 581 relates to an installation, the phase 582 relates to a device authentication (first factor) and the phase 583 relates to a user authentication (second factor).

With regard to the installation phase 581, the user 42 installs the transaction application 22 on the mobile device 20. This is followed by a step 505 in which a device identifier related to the mobile device 20 is registered and stored on the mobile host 32 by means of a respective communication between the application 22 and the mobile host 32 (REG DEV ID). In the step 505, information and data such as a device fingerprint of the mobile device 20 and certificates may be taken into account.

This is followed by a step 510 which summarizes above-described steps with regard to the preparation of the scanning (e.g. the steps 101, 105, 106, 108, 109, 110, 115). In a subsequent step 130, the initiation data is transmitted from the terminal device 10 to the mobile device 20, provided that the tapping or, respectively, scanning is carried out (step 125, not depicted in FIG. 12). Afterwards, steps as described above may be carried out, e.g. the steps 145, 160, as indicated in FIG. 12.

With regard to the device authentication phase 582, which may follow afterwards, a communication may be carried out between the transaction application 22 of the mobile device 20 and the mobile host 32 in a step 521. With regard to this, the mobile host 32 may take into account the stored device identifier of the mobile device 20. In case of a positive mobile device authentication, the mobile host 32 may transmit a first confirmation information to the terminal host 31 in a step 522, which includes the device identifier (CONFIRMED DEV ID). The confirmation information (including the device identifier) may be also transmitted from the terminal host 31 to the terminal application 12 of the terminal device 10 in a step 523.

With regard to the user authentication phase 583, which may follow afterwards, the mobile host 32 sends a request to the terminal host 31 in a step 531 which then subsequently sends a request to the terminal application 12 in a step 532. In these steps 531, 552, a uniquely assigned identifier which is denoted as "challenge" and which is provided by means of the mobile host 32 is transmitted from the mobile host 32 to the terminal host 31 and from there to the terminal application 12 (CHALLENGE). In response to that, the user 42 of the mobile device 20 is requested to enter a pin on the terminal device 10 which may be communicated or, respectively, displayed to the user 42. The user 42 therefore enters the pin on the terminal device 10 in a step 533 (PIN), and information related to the entered pin is transferred from the terminal application 12 to the terminal host 31 in a step 534.

With regard to the step 534, information comprising the pin, the challenge identifier and the device identifier may be transmitted to the terminal host 31 in a crypto protected form. Such crypto protected information is subsequently transmitted from the terminal host 31 to the mobile host 32 in a step 535 whereupon the mobile host 32 checks if the entered pin is correct (CHECK). In this respect, a pin of the user 42 stored on the mobile host 32 is taken into account. Moreover, in case of a positive user authentication, the mobile host 32 transmits a second confirmation information to the terminal host 31 in a step 570 (AUTH OK). This is followed by respective confirmation communications 571, 572 carried out between the hosts 31, 32 and the devices 10, 20. A respective confirmation is also provided or, respectively, displayed to the user 42 by means of the transaction application 22 (step 573). This may similarly apply to the user 41, wherein the confirmation is provided by means of the terminal application 12 (step 574).

The underlying electronic transaction may only be finalized under the condition that both the mobile device authentication and the user authentication are positive, and that both the first and the second confirmation information are transmitted from the mobile host 32 to the terminal host 31 (steps 522, 570). Upon finalizing the electronic transaction, a respective communication may additionally take place between the two hosts 31, 32, as indicated by means of a step 170 in FIG. 12 (TRX OK). Optionally, other transactional workflow specific communication may occur between respectively the mobile or terminal users 41, 42, applications 12, 22 and/or hosts 31, 32 (not depicted).

Figure 13:
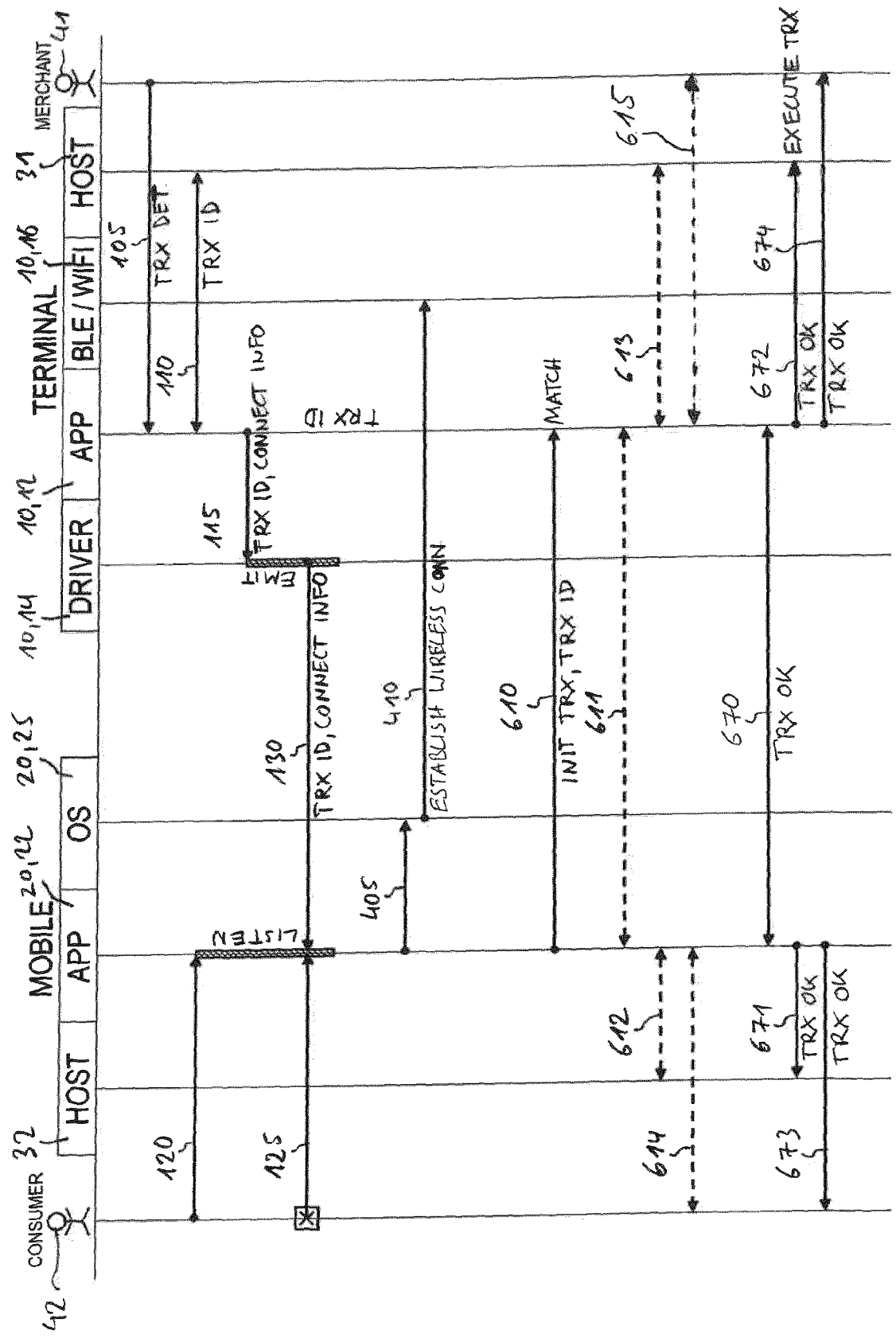
FIG. 13 shows a schematic diagram illustrating interactions and data flow when carrying out an electronic transaction method with the participation of a terminal device, a mobile device and a terminal host, wherein a wireless connection is established between the terminal device and the mobile device.

FIG. 13 shows a schematic diagram illustrating interactions and data flow when carrying out another embodiment of the method. This embodiment is based on a local communication between the terminal device 10 and the mobile device 20. In the method, steps such as the above-described steps 105, 110, 115, 130 are carried out, wherein, similar to FIG. 11, connection information (CONNECT INFO) is comprised in the initiation data transmitted in the steps 115, 130 in order to establish a local wireless connection between the devices 10, 20 different from the initiation communication 50. A (unique) transaction identifier (TRX ID) is stored on the terminal device 10.

On the side of the mobile device 20, above-described steps 120, 125 are carried out such that the initiation data comprising the connection information is received by means of the transaction application 22. This is followed by above-described steps 405, 410 by means of which a wireless connection such as a BLE- or a Wi-Fi-connection is established between the two devices 10, 20 (ESTABLISH WIRELESS CONN). On the side of the terminal device 10, this is carried out by means of the communication module 16.

Afterwards, as shown in FIG. 13, in a step 610, the transaction application 22 of the mobile device 20 communicates with the terminal application 12 of the terminal device 10 via the established wireless connection between the two devices 10, 20 and transmits the transaction identifier to the terminal application in order to initiate the electronic transaction (INIT TRX). Upon this communication, the terminal application 12 may determine a match between the transaction identifier stored on the terminal device 10 and the transaction identifier transmitted from the transaction application 22 via the established wireless connection. Only under the condition that such a match is determined, a respective confirmation communication is carried out between the terminal application 12 of the terminal device 10 and the transaction application 22 of the mobile device 20 (step 670, TRX OK).

This is followed by respective confirmation communications in which confirmation information is transmitted from the applications 12, 22 to the associated hosts 31, 32 (steps 671, 672). On the basis of the step 672, in which the confirmation is transmitted from the terminal application 12 to the terminal host 31, the actual electronic transaction may be executed by means of the terminal host 31 (EXECUTE TRX). Respective confirmations are also communicated or, respectively, displayed to the users 41, 42 by carrying out steps 673, 674. Moreover, as indicated in FIG. 13 by means of optional steps 611, 612, 613, 614, 615, further possible communications, transaction related dialogue and/or interactions may be carried out between the applications 12, 22 themselves, between the applications 12, 22 and the hosts 31, 32 and between the applications 12, 22 and the users 41, 42.

Figure 14:
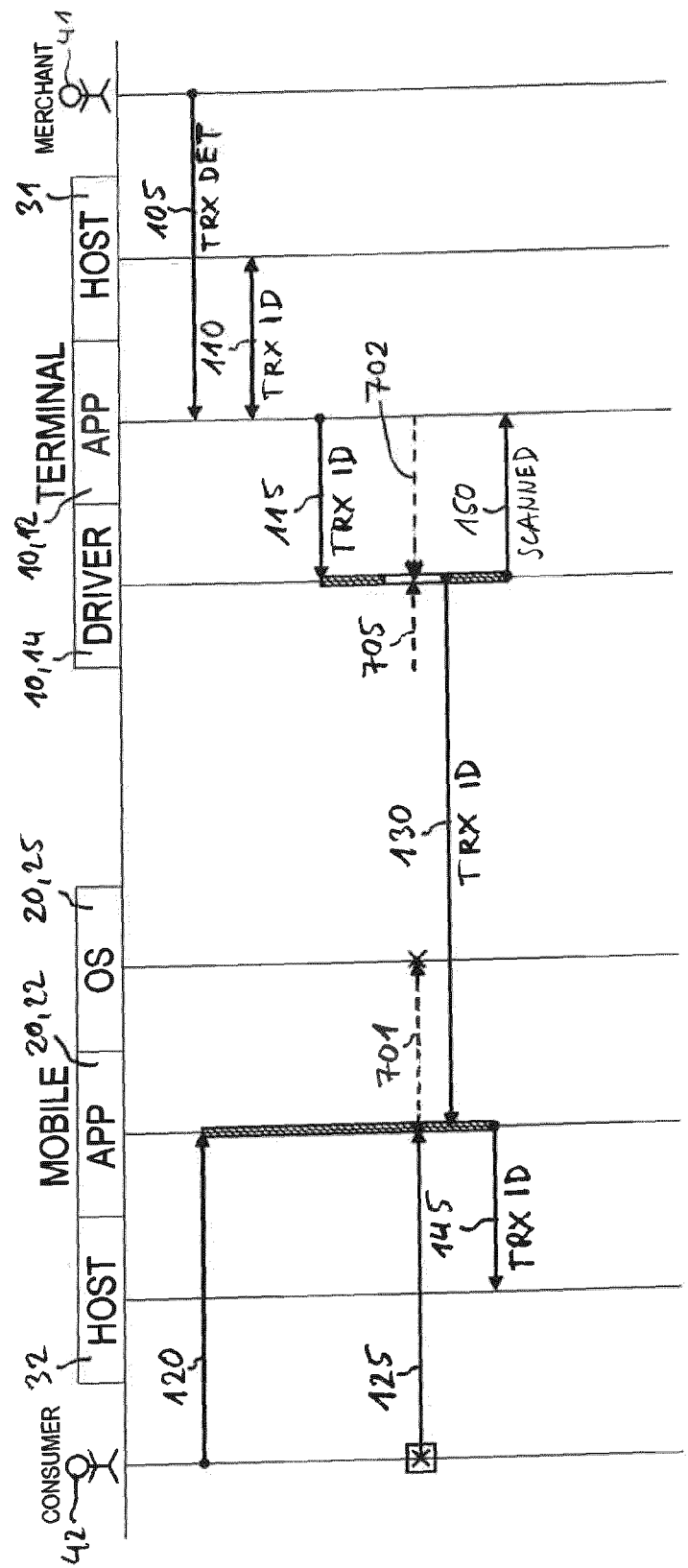
FIG. 14 shows a schematic diagram illustrating interactions and data flow when carrying out an initiation communication between a terminal device and a mobile device, wherein the terminal device alternately acts in a transmitting mode and in a receiving mode.

FIG. 14 shows a schematic diagram illustrating interactions and data flow with regard to another feature, which may be added to the method or to embodiments of the method described here. This feature may be applied for the case that the initiation communication 50 is carried out by means of NFC.

As shown in FIG. 14, steps such as the above-described steps 105, 110, 115 are carried out. In response to step 115 in which the initiation data is transmitted from the terminal application 12 to the communication driver 14, the communication driver 14 and thus the terminal device 10 alternately act in a transmitting mode for providing the initiation data and in a receiving mode for receiving transactional data. This behavior may, as the case may be, controlled by means of the terminal application 12. In FIG. 14, the receiving mode for receiving transactional data is indicated by means of an arrow 705. The receiving mode of the terminal device 10 may relate to the initiation of an electronic transaction according to a different transaction scheme, e.g. a conventional EMV (Europay International, Mastercard and Visa) NFC transaction scheme.

The transaction application 22 of the mobile device 20 detects the receiving mode of the terminal device 10 immediately after the mobile device 20 is tapped (step 125). In this regard, the transaction application 22 may utilize the electromagnetic coupling between the NFC modules 19, 29 (see FIG. 4) of the devices 10, 20 or, respectively of their antennas, and the fact that the NFC module 19 of the terminal device 10 is powered up both in the transmitting and in the receiving mode. Therefore, in a step 701, the transaction application 22 suppresses the operating system 25 and thus the mobile device 20 to act in a transmitting mode for transmitting transactional data. Instead of this, it is effected that the mobile device 20 acts in a receiving mode. In this regard, the initiation data provided by means of the terminal device 10 is received by means of the transaction application 22 of the mobile device 20. As indicated in FIG. 14, this may be followed by a step 145 in which the transaction application 22 transmits the transaction identifier (which was comprised in the initiation data transmitted from the terminal device 10) to the associated mobile host 32.

It is pointed out that the transaction application 22 of the mobile device 20 may continuously suppress the operating system 25 of the mobile device 20 to act in a transmitting mode. This may apply as soon as the transaction application 22 is opened on the mobile device 20, as this clearly indicates the mobile user's intent to use the transaction methods described and supported by the application 22.

Alternatively, it is possible that the terminal application 12 of the terminal device 10 detects that the mobile device 20 or an application of the mobile device 20 is listening for data according to the methods described or, respectively, is acting in a receiving mode for receiving initiation data, and as such suppresses any other NFC transaction types on the terminal device 10, like e.g. EMV. With regard to the detection, the terminal application 12 may utilize the electromagnetic coupling between the NFC modules 19, 29 (see FIG. 4) of the devices 10, 20 or, respectively of their antennas. For the purpose of suppressing, in a step 702, the terminal application 12 may act on or control the communication driver 14 of the terminal device 10 such that the receiving mode of the terminal device 10 is suppressed, and instead of this it is effected that the driver 14 and thus the terminal device 10 only act in the transmitting mode for providing the initiation data. By means of the suppressing, the alternating behavior of the terminal device 10 may be stopped.

The above indicated alternating behavior of the terminal device 10 makes it possible that, with respect to the initiation communication 50, the user 41 of the terminal device 10 does not have to specify and set a respective mode of the terminal device 10.

The embodiments explained above with reference to the figures constitute preferred or exemplary embodiments of the invention. Besides the embodiments described and depicted, further embodiments are conceivable which may comprise further modifications and/or combinations of features.

In this respect, it is pointed out that a mobile device may comprise a transaction application and/or a browser and in addition, for receiving initiation data transmitted from a terminal device, a respective data receiving application which, instead of the operating system, carries out the receiving of the initiation data, together with the communication means of the mobile device. Such a data receiving application may transmit data components of the received initiation data (like e.g. a transaction identifier) to the transaction application or to the browser upon which the transaction application or browser may carry out a further step (e.g. transmitting the transaction identifier to an associated mobile host, establishing an internet session). With regard to this, variants of embodiments may be considered in which the functionality of the operating system is replaced by a data receiving application. This may e.g. apply to the diagrams shown in FIGS. 3, 6, 7 and 8.

Although the invention has been more specifically illustrated and described in detail by means of preferred exemplary embodiments, nevertheless the invention is not restricted by the examples disclosed and other variations may be derived therefrom by the person skilled in the art, without departing from the scope of protection of the invention.

| Reference list | |
|---|---|
| 10 | terminal device |
| 12 | terminal application |
| 14 | communication driver |
| 16 | module |
| 19 | NFC module |
| 20 | mobile device |
| 22 | transaction application |
| 25 | operating system |
| 27 | browser |
| 29 | NFC module |
| 30 | host system |
| 31 | terminal host |
| 32 | mobile host |
| 41 | user, merchant |
| 42 | user, consumer |
| 50 | initiation communication |
| 60 | internet page |
| 51, 52, 55 | communication |
| 71, 72 | step |
| 81, 82, 83 | step |
| 84, 85, 86 | step |
| 87, 88 | step |
| 101, 105, 106 | step |
| 108, 109, 110 | step |
| 115, 120, 125 | step |
| 130, 140, 145 | step |
| 150, 151, 160 | step |
| 170, 171, 172 | step |
| 173, 174, 180 | step |
| 185, 191, 192 | step |
| 193, 194 | step |
| 205, 210, 215 | step |
| 220, 225 | step |
| 231, 232, 233 | step |
| 239, 260, 270 | step |
| 275 | step |
| 301, 302, 303 | step |
| 304 | step |
| 311, 312 | phase |
| 360 | step |
| 405, 410, 445 | step |
| 501, 505, 510 | step |
| 521, 522, 523 | step |
| 531, 532, 533 | step |
| 534, 535, 570 | step |
| 571, 572, 573 | step |
| 574 | step |
| 581, 582, 583 | phase |
| 610, 611, 612 | step |
| 613, 614, 615 | step |
| 670, 671, 672 | step |
| 673, 674 | step |
| 701, 702, 705 | step |

The invention claimed is:

1. A communication method for carrying out an electronic transaction, comprising:

assigning a transaction identifier by a terminal device to the electronic transaction for a time interval starting with transmission of initiation data including the transaction identifier to a mobile device;

storing the transaction identifier on a terminal host of a computer host system, wherein the terminal host is associated with the terminal device;

carrying out an initiation communication between the terminal device and the mobile device by means comprising near field communication (NFC), visible light communication, acoustic communication, or a combination thereof, wherein the mobile device is brought into close proximity to the terminal device, wherein the initiation communication between the terminal device and the mobile device is a unidirectional communication in which a data signal comprising the initiation data is transmitted from a communication means of the terminal device to a communication means of the mobile device;

suppressing, by a transaction application of the mobile device, that the mobile device acts in a transmitting mode for providing transactional data, and, instead effecting that the mobile device acts in a receiving mode for receiving the initiation data from the terminal device;

upon transmitting the initiation data from the terminal device to the mobile device, carrying out further communications via the internet, respectively between the terminal device and the terminal host and the mobile device and a mobile host of the computer host system, said mobile host being associated with the mobile device, for executing by the computer host system an electronic transaction on the basis of the initiation communication between the terminal device and the mobile device, wherein the further communications comprises transmitting the transaction identifier from the mobile device to the terminal host, in order to initiate carrying out the electronic transaction; and carrying out the electronic transaction only under the condition that a match between the transmitted transaction identifier and the stored transaction identifier is determined by the terminal host, wherein the time interval belongs to a group comprising a predefined time interval and a time interval extending to the end of the electronic transaction, in order to allow the terminal device to securely carry out a plurality of electronic transactions with different mobile devices in parallel based on different transaction identifiers.

2. The method according to claim 1, wherein transmitting the transaction identifier from the mobile device to the terminal host comprises, upon receiving the initiation data by the mobile device, transmitting the transaction identifier from the mobile device to the mobile host associated with the mobile device and subsequently transmitting the transaction identifier from the mobile host to the terminal host.

3. The method according to claim 2, wherein receiving the initiation data by the mobile device and transmitting the transaction identifier from the mobile device to the mobile host is carried out by means of the transaction application of the mobile device.

4. The method according to claim 2, wherein the initiation data comprises an application identifier, wherein, upon receiving the initiation data by the mobile device, the transaction application which is associated with the application identifier is launched on the mobile device, and wherein the transaction identifier is transmitted from the mobile device to the mobile host by means of the transaction application launched on the mobile device.

5. The method according to claim 2, wherein the initiation data comprises an internet address identifier, wherein, upon receiving the initiation data by the mobile device, a browser is launched on the mobile device which establishes an intern et session with the terminal host on the basis of the internet address identifier, wherein, during the internet session, an application identifier is transmitted from the terminal host to the browser, wherein, upon receiving the application identifier by the browser, the transaction application which is associated with the application identifier is launched on the mobile device, and wherein the transaction identifier is transmitted from the mobile device to the mobile host by means of the transaction application launched on the mobile device.

6. The method according to claim 5, wherein the application identifier relates to a transaction application which is selected from a plurality of available transaction applications by a user of the mobile device, wherein for carrying out the selection by the user, an internet page indicating the plurality of available transaction applications is displayed on the mobile device by means of the browser during the internet session, and wherein a user input on the mobile device in which one of the available transaction applications is selected by the user is taken into account, or wherein the application identifier relates to a transaction application which is automatically selected from a plurality of available transaction applications by means of the terminal host.

7. The method according to claim 1, wherein the initiation data comprises an internet address identifier, wherein, upon receiving the initiation data by the mobile device, a browser is launched on the mobile device which establishes an internet session with the terminal host on the basis of the internet address identifier, and wherein, during the internet session, the transaction identifier is transmitted from the mobile device to the terminal host by means of the browser launched on the mobile device.

8. The method according to claim 1, wherein the initiation data comprises connection information for establishing a wireless connection different from the initiation communication between the terminal device and the mobile device, wherein, upon transmitting the initiation data from the terminal device to the mobile device, a wireless connection is established between the terminal device and the mobile device on the basis of the connection information, and wherein transmitting the transaction identifier from the mobile device to the terminal host is carried out via the established wireless connection between the terminal device and the mobile device.

9. The method according to claim 1, wherein a device authentication relating to the mobile device is carried out by means of a communication between the mobile device and the mobile host associated with the mobile device, taking into account a device identifier which is stored on the mobile host and which relates to the mobile device, wherein, in case of a positive mobile device authentication, a first confirmation information is transmitted from the mobile host to the terminal host, wherein a user authentication relating to a user of the mobile device is carried out by means of requesting the user to enter a Personal Identifier Number, PIN, on the terminal device, transferring information reflecting the entered pin from the terminal device to the mobile host via the terminal host, and taking into account a PIN of the user stored on the mobile host, and wherein, in case of a positive user authentication, a second confirmation information is transmitted from the mobile host to the terminal host.

10. The method according to claim 1, wherein the initiation data comprises connection information for establishing a wireless connection different from the initiation communication between the terminal device and the mobile device, wherein, upon transmitting the initiation data from the terminal device to the mobile device, a wireless connection is established between the terminal device and the mobile device on the basis of the connection information, wherein the transaction identifier is transmitted from the mobile device to the terminal device via the established wireless connection between the terminal device and the mobile device, and wherein the electronic transaction is carried out only under the condition that a match between the transmitted transaction identifier and the stored transaction identifier is determined by the terminal device.

11. The method according to claim 1, wherein, during the initiation communication, the terminal device alternately acts in a transmitting mode for providing the initiation data and in a receiving mode for receiving the transactional data.

12. A communication system for carrying out an electronic transaction, comprising:

a terminal device configured to:
assign a transaction identifier to the electronic transaction for a time interval starting with transmission of initiation data including the transaction identifier to a mobile device, and carry out an initiation communication with the mobile device by means comprising near field communication (NFC), visible light communication, acoustic communication, or a combination thereof when the mobile device is brought into close proximity to the terminal device, wherein the initiation communication between the terminal device and the mobile device is a unidirectional communication in which a data signal comprising the initiation data is transmitted from a communication means of the terminal device to a communication means of the mobile device;

a computer host system comprising a terminal host associated with the terminal device and a mobile host associated with the mobile device, wherein the terminal host is configured to store the transaction identifier; and the mobile device configured to:
suppress, by a transaction application of the mobile device, that the mobile device acts in a transmitting mode for providing transactional data, and, instead effect that the mobile device acts in a receiving mode for receiving the initiation data from the terminal device, receive the initiation date from the terminal device, and after receiving the initiation data from the terminal device, participate in further communications via the internet with the terminal host including transmitting the transaction identifier to the terminal host in order to initiate carrying out the electronic transaction;

wherein the electronic transaction is carried out only under the condition that a match between the transmitted transaction identifier and the stored transaction identifier is determined by the terminal host, and wherein the time interval belongs to a group comprising a predefined time interval and a time interval extending to the end of the electronic transaction, in order to allow the terminal device to securely carry out a plurality of electronic transactions with different mobile devices in parallel based on different transaction identifiers.

13. The communication system according to claim 12, wherein the transmission of the transaction identifier from the mobile device to the terminal host comprises, transmitting the transaction identifier from the mobile device to the mobile host and subsequently transmitting the transaction identifier from the mobile host to the terminal host.

14. The communication system according to claim 13, wherein receipt of the initiation data by the mobile device and transmission of the transaction identifier by the mobile device to the mobile host is carried out by means of the transaction application.

* * * * *